United States Patent
McIntosh

(10) Patent No.: US 11,988,948 B2
(45) Date of Patent: May 21, 2024

(54) PERSONAL PROJECTION SYSTEM FOR TRAVEL ENVIRONMENTS AND METHODS OF OPERATING THEREOF

(71) Applicant: THE BOEING COMPANY, Chicago, IL (US)

(72) Inventor: Darren Carl McIntosh, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/724,950

(22) Filed: Apr. 20, 2022

(65) Prior Publication Data
US 2022/0382135 A1 Dec. 1, 2022

Related U.S. Application Data

(60) Provisional application No. 63/193,470, filed on May 26, 2021.

(51) Int. Cl.
*G03B 21/14* (2006.01)
*B64D 11/00* (2006.01)

(52) U.S. Cl.
CPC ........ *G03B 21/142* (2013.01); *B64D 11/0015* (2013.01)

(58) Field of Classification Search
CPC ........................... G03B 21/142; G03B 21/147; G03B 21/2053; B64D 11/0015; B64D 11/00151; B64D 11/00153; B64D 11/00155; B64D 11/0038; H04N 9/3129; H04N 9/3155; H04N 9/3164; H04N 9/3173; H04N 9/3185; H04N 9/3194
See application file for complete search history.

(56) References Cited

U.S. PATENT DOCUMENTS

| | | | |
|---|---|---|---|
| 6,964,481 B2 | 11/2005 | Pho et al. | |
| 8,608,317 B2 | 12/2013 | Babst | |
| 8,789,954 B1 | 7/2014 | Atkins et al. | |
| 2009/0096994 A1* | 4/2009 | Smits | H04N 9/3194 353/30 |
| 2012/0113399 A1* | 5/2012 | Yeom | H04N 9/3194 353/121 |

(Continued)

OTHER PUBLICATIONS

Hubert, Benjamin; Layer's 'Sequel Seat' is designed to entice moviegoers back to cinemas post COVID-19; available at https://www.designboom.com/design/layer-sequel-seat-moviegoers-cinemas-post-covid-19-08-25-2020/; last visited Apr. 3, 2022; 18 pp.

*Primary Examiner* — Sultan Chowdhury
(74) *Attorney, Agent, or Firm* — Alleman Hall & Tuttle LLP

(57) ABSTRACT

A passenger service unit is provided. The passenger service unit includes at least one projector configured to project an image onto one or more display surfaces, at least one sensor configured to indicate a current position of the one or more display surfaces, and a projector controller in communication with the at least one projector and the at least one sensor. The projector controller is programmed to receive a signal from the at least one sensor indicating a current position of a display surface and instruct the at least one projector to project at least one image onto the tray table based on the current position of the display surface.

23 Claims, 18 Drawing Sheets

(56) References Cited

U.S. PATENT DOCUMENTS

| | | | |
|---|---|---|---|
| 2015/0042964 A1* | 2/2015 | Furui | H04N 9/3185 |
| | | | 353/121 |
| 2018/0357942 A1* | 12/2018 | Lin | H05K 5/0217 |
| 2019/0278549 A1* | 9/2019 | Monden | G09G 5/14 |
| 2019/0302580 A1* | 10/2019 | Chen | G03B 21/008 |
| 2019/0306478 A1* | 10/2019 | Tamura | H04N 9/3194 |

* cited by examiner the projector system. The projector control-
PERSONAL PROJECTION SYSTEM FOR TRAVEL ENVIRONMENTS AND METHODS OF OPERATING THEREOF

CROSS-REFERENCE TO RELATED APPLICATIONS

This application claims priority to U.S. Provisional Patent Application Ser. No. 63/193,470, filed May 26, 2021, entitled "PERSONAL PROJECTION SYSTEM FOR TRAVEL ENVIRONMENTS AND METHODS OF OPERATING THEREOF", the entire contents and disclosures of which are hereby incorporated herein by reference in its entirety.

BACKGROUND

The field of the present disclosure relates generally to projection systems and, more specifically, to projecting light, images, and video onto desired surfaces in a travel environment.

Many purchasers of aircraft and other fleet vehicles require that the vehicle be personalized for their brand or image. In many cases, this includes having logos or images on different surfaces of the vehicle. However, many of these customizations are expensive and would have to be removed if the vehicle is resold. These customizations also require special set-ups on the assembly lines, which then slows down the production process. Furthermore, these customizations would need to be implemented in areas with limited space for additional equipment. One particular area of customization is the individual seating area of the passengers, where the purchasers are looking for distinct features to increase their visibility and the comfort of their passengers. Accordingly, it would be advantageous to have a system that allows for customization of vehicles without requiring changes to the production of the vehicle.

BRIEF DESCRIPTION

In one aspect, a projection unit is provided. The projection unit includes at least one projector configured to project an image onto one or more display surfaces. The projection unit also includes at least one sensor configured to indicate a current position of the one or more display surfaces. The projection unit further includes a projector controller in communication with the at least one projector and the at least one sensor. The projector controller is programmed to receive a signal from the at least one sensor indicating a current position of a display surface, adjust at least one image to project based on the current position of the display surface, and instruct the at least one projector to project the adjusted at least one image onto the display surface based on the current position of the display surface.

In another aspect, a method for operating a projector system is provided. The method is implemented by a computing device comprising at least one processor in communication with at least one memory device. The computing device is in communication with at least one sensor and at least one projector. The method includes receiving, from the at least one sensor, a signal indicating a current position of a display surface, adjusting at least one image to project based on the current position of the display surface, and instructing the at least one projector to project the adjusted at least one image onto the display surface based on the current position of the display surface.

DETAILED DESCRIPTION

Figure 1:
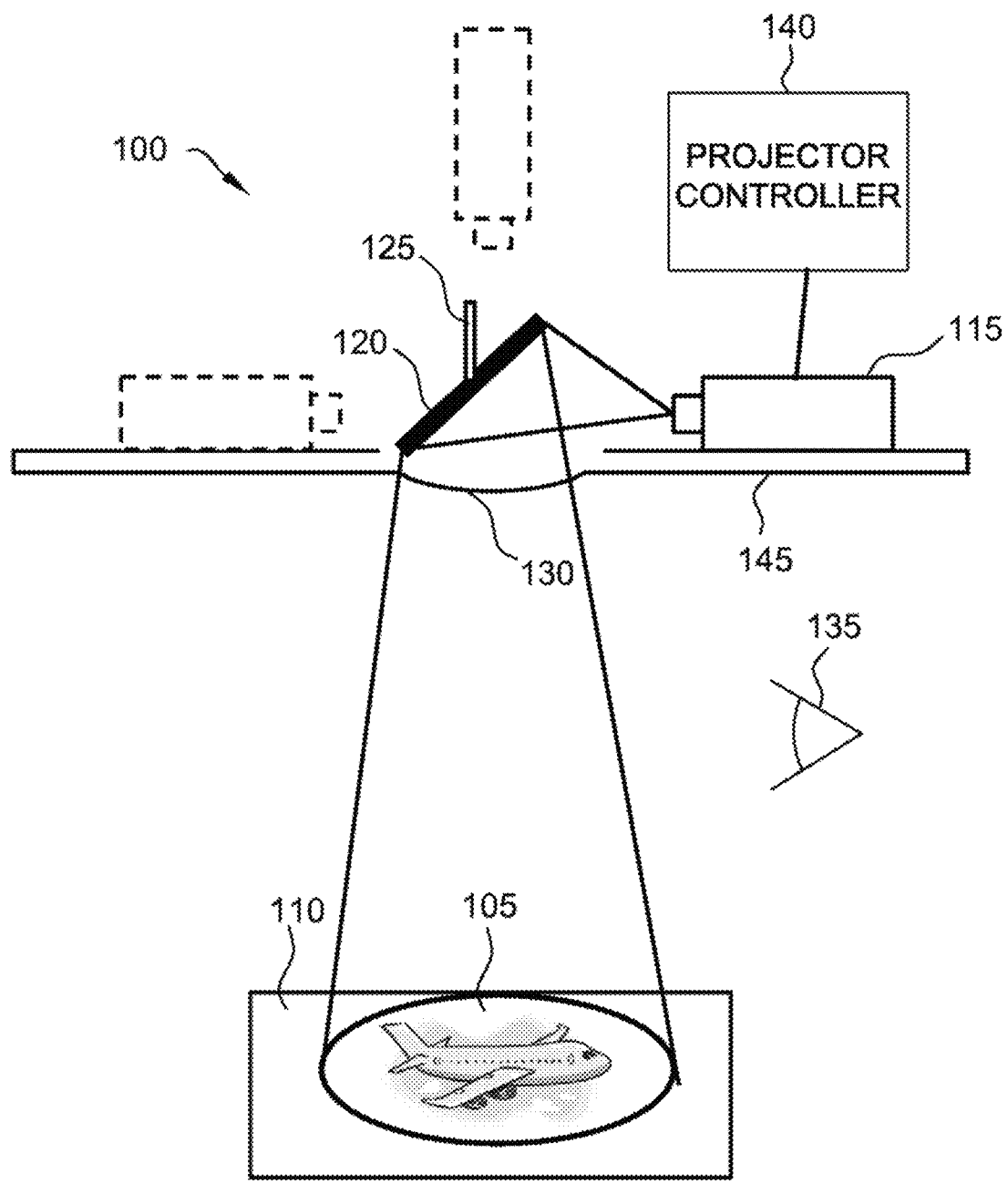
FIG. 1 illustrates a projector system for projecting an image onto a display surface in accordance with one example of the present disclosure.

The field of the present disclosure relates generally to projection systems and, more specifically, to projecting light, images, and video onto desired surfaces in a travel environment.

In particular, the projection system includes a projector, such as a short-throw projector, and is controlled by a projector controller computer device. The projector controller computing device controls the projector as it transmits images to display on a surface. In some embodiments, the projector is positioned in a passenger area where the projector is configured to project images for a passenger seated below the projector. In these embodiments, the projector is situated over the passenger's head, such as in a passenger service unit. The passenger service unit includes one or more functionalities for the passenger, such as, but not limited to, lighting, communication with service staff, and airflow adjustments. The projector projects the image on a projection face of a display surface. The projector is hidden away from the viewer to increase the viewing experience and to protect the projector. Projectors can be configured to display information and/or entertainment, personalized lighting for the passenger, supplemental emergency lighting, supplemental information to assist with boarding and/or deplaning, and/or other information as needed. Furthermore, the projectors can be configured to display desired images, allowing for customization without requiring additional equipment. In addition, the images can be changed when desired. The projectors can be configured to display images, series of images, videos, and/or animations.

In the case of an overhead projectors, the projectors can be configured to project light and/or images onto a passenger's tray table, the floor, the passenger's seat, or even directly onto the passenger and/or their belonging, such as reading material. The projector controller computing device is in communication with one or more sensors that inform the projector controller computing device if the tray table is in an up or stowed position or if the tray table is in the down or deployed position. The projector controller computing device instructs the projector to display an image when the tray table is in the down or deployed position and to discontinue projection when the tray table is in the up or stowed position. While a tray table is used as an example implementation herein, after reading this specification it will be recognized other implementations and applications are within the scope of the present disclosure, including but not limited to other stowable support surfaces such as trays, tables, workstations, among others.

Described herein are computer systems such as the projector controller computing devices and related computer systems. As described herein, all such computer systems include a processor and a memory. However, any processor in a computer device referred to herein can also refer to one or more processors wherein the processor can be in one computing device or a plurality of computing devices acting in parallel. Additionally, any memory in a computer device referred to herein can also refer to one or more memories wherein the memories can be in one computing device or a plurality of computing devices acting in parallel.

As used herein, a processor can include any programmable system including systems using micro-controllers, reduced instruction set circuits (RISC), application-specific integrated circuits (ASICs), logic circuits, and any other circuit or processor capable of executing the functions described herein. The above examples are example only and are thus not intended to limit in any way the definition and/or meaning of the term "processor."

As used herein, the term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Washington). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, CA). In yet a further example, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some examples, the system includes multiple components distributed among a plurality of computer devices. One or more components can be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present examples can enhance the functionality and functioning of computers and/or computer systems.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional embodiments that also incorporate the recited features.

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The systems and processes are not limited to the specific examples described herein. In addition, components of each system and each process can be practiced independent and separate from other components and processes described herein. Each component and process also can be used in combination with other assembly packages and processes.

The patent claims at the end of this document are not intended to be construed under 35 U.S.C. § 112(f) unless traditional means-plus-function language is expressly recited, such as "means for" or "step for" language being expressly recited in the claim(s).

FIG. 1 illustrates a projector system 100 for projecting an image 105 onto a display surface 110 in accordance with the present disclosure. In the example, a display surface 110 includes any surface that allows images to be projector onto. The display surface 110 includes, but is not limited to, a down or deployed tray table, a tablecloth on a tray table or other table, the floor, the passenger's seat, the passenger themselves, and one or more objects held by the passenger. In the example, display surface 110 faces a viewer 135 (or observer). In some embodiments, the projector system 100 is also known as a projection unit 100.

In the example, a projector 115 projects an image 105 towards a mirror 120. The mirror 120 is attached to a gimbal 125 that allows the mirror 120 to be moved to adjust the location of the image 105. The mirror 120 reflects the image 105 through an aperture 130 in a ceiling 145 of the passenger area to the display surface 110. In other embodiments, the aperture 130 is in a wall of the passenger area.

While the projector 115 shown in FIG. 1 is to the right of the mirror 120 and aperture 130, the one or more projectors 115 can also be positioned directly above the aperture 130, to any side of the aperture 130, or even positioned at a different angle to project to the mirror 120 and/or through the aperture 130. The one or more projectors 115 are configured to project images 105 through the aperture 130 onto display surface 110. The image 105 is then viewed by a viewer 135. In the example, the projector 115 projects the image 105 in reverse to the mirror 120, so that the image 105 can be displayed in the proper orientation by the viewer 135. In the example, the projector 115 is at least one of a short-throw projector, an ultrashort-throw projector, a GOBO (goes before objects) projector, or another projector that works as described herein. The term GOBO (Go Before Optics) specifically refers to a device placed in "the gate" or at the "point of focus" between the light source and the lenses (or other optics). In the example, the projector 115 is only a short distance from at least one of mirror 120, aperture 130, and/or display surface 110 and is configured to project from a close distance. Furthermore, the projector 115 is configured to project onto curved or uneven surfaces, so that the image 105 does not appear distorted to the viewer 135. In this example, the projector 115 is programmed to adjust the image 105 that is projected to the contours and shape of the display surface 110 that is being projected on to avoid skew. This adjustment can be made when the projector 115 is originally configured while being installed. In addition, the projector 115 is also configured to use keystone image correction techniques for where the projector 115 is at an angle to the display surface 110.

The projector 115 is controlled by a projector controller 140. The projector controller 140 instructs the projector 115 as to which images 105 to project and when and where to project those images. The projector controller 140 can provide images to the projector 115. The projector controller 140 can also provide images 105 that have been adjusted to the contours of the display surface 110 to the projector 115. If the projector controller 140 determines that it is appropriate to go into a sleep mode, the projector controller 140 would then instruct the projector 115 to stop projecting images 105 to conserve energy, to reduce heat, and/or to reduce wear and tear on the projector 115. The projector controller 140 can activate sleep mode a predetermined period of time after a sensor signal has been received, after a series of images have been displayed a predetermined period of time, after a specific sensor signal has been received, during a specific mode, or based on a command from one or more other computer devices. In some examples, the projector controller 140 is a part of the projector 115. In other examples, the projector controller 140 is separate from and in communication with the projector 115. In some further examples, the projector controller 140 controls multiple projectors 115.

In other situations, other images 105 can be displayed on the display surface 110, such as, but not limited to, branding and logos, destination theming, trip progress information, news, emergency instructions, financial data (e.g., stock ticker information), video clips, and/or any other images or video desired.

The projector 115 is situated over the passenger's head, such as in a passenger service unit. The passenger service unit includes one or more functionalities for the passenger, such as, but not limited to, lighting, communication with service staff, and airflow adjustments. The passenger service unit includes a separator 145 (such as a ceiling or wall) that protects the elements of the projector system 100. Furthermore, when used in a vehicle, such as an airplane, an autobus, a train, watercraft, and/or any other vehicle, the projector 115 can be subject to vibration from the vehicle itself. To correct this issue, the projector 115, mirror 120, and/or gimbal 125 can be mounted on residual isolating mounts or anti-vibration mounts to prevent or limit image movement.

In the example, the gimbal 125 is a single axis gimbal that allows mirror 120 to move forward and aft adjustment of the projected image 105. The forward and aft movement would allow the image 105 to be moved as the display surface 110 is moved, such as for tray tables that have forward and back adjustment capabilities to better accommodate the seated passenger. A second axis of movement on the gimbal 125 could allow inbound and outbound adjustments to the image 105.

Figure 3:
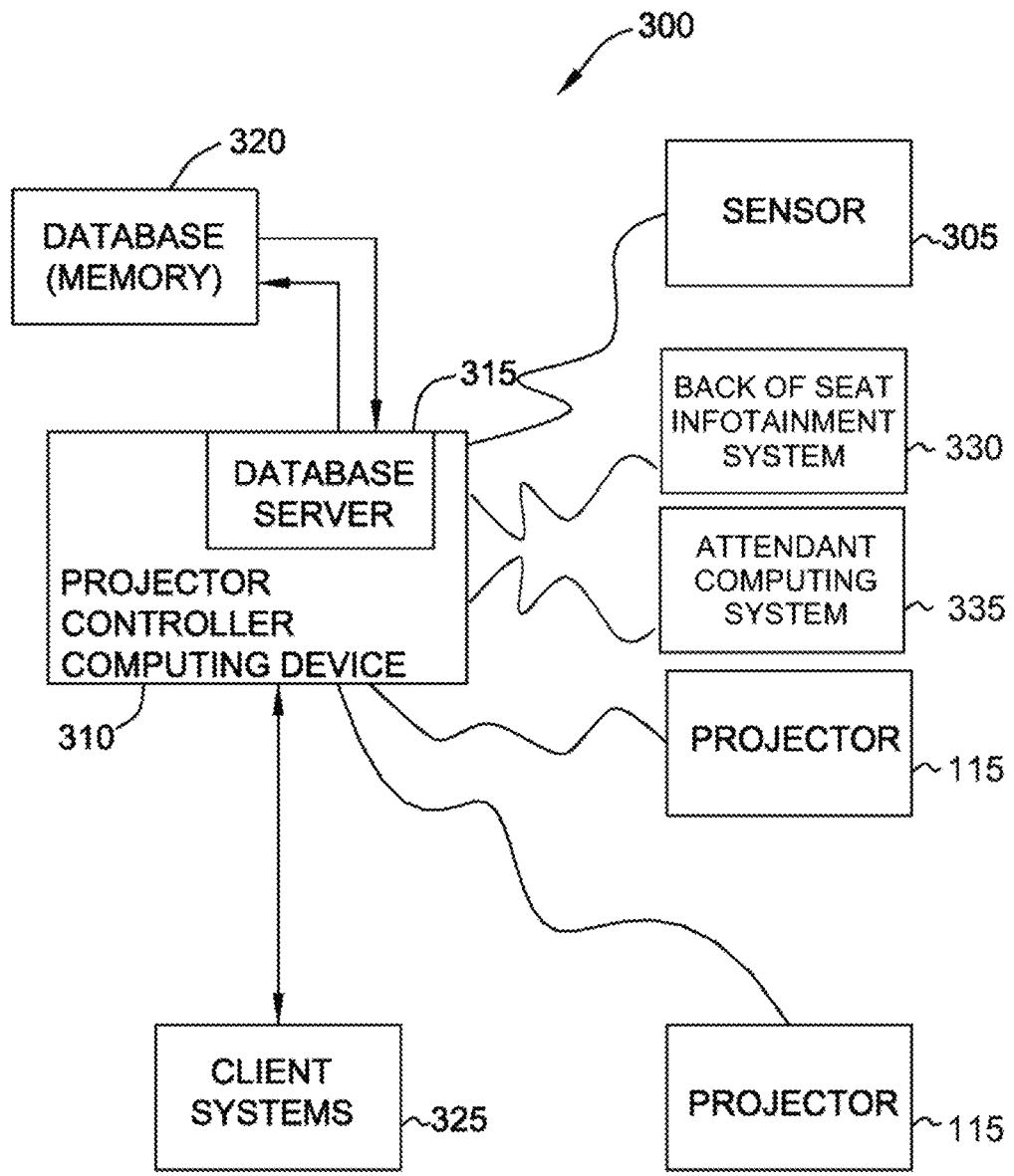
FIG. 3 is a simplified block diagram of an example projector system for executing the projector systems shown in FIGS. 1 and 2.

In some examples, the projector system 100 includes one or more sensors, such as sensors 305 (shown in FIG. 3). The sensors can include, but are not limited to, sensors to detect whether or not the tray table is deployed, sensors detecting a current position and/or orientation of the tray table, sensors to detect one or more objects on the display surface 110, sensors to detect a location and/or orientation of one or more objects to act as a display surface 110, and/or sensors to detect a position and/or presence of a passenger in the seat. These different sensors transmit information to the projector controller 140. The projector controller 140 can use the information to adjust the image(s) and/or videos being displayed.

In some further examples, the sensors can detect hand movements of the seated passenger. This would allow the projector system 100 to be interactive with the passenger. For example, the projector 115 can display a menu of choices on the display surface 110. Based on where the passenger places their hand or gestures, the sensors can detect that movement and the projector controller 140 can determine a user's choice based on the movement. For example, the projector 115 can project a dinner menu with choices and the passenger can move their hand to the choices that they wish to make. Furthermore, the projector 115 can project a game or other interactive activity that allows the passenger to interact with the projected images 105 and the projector controller 140 updates the projected images 105 based on the passenger's interactions.

Figure 2:
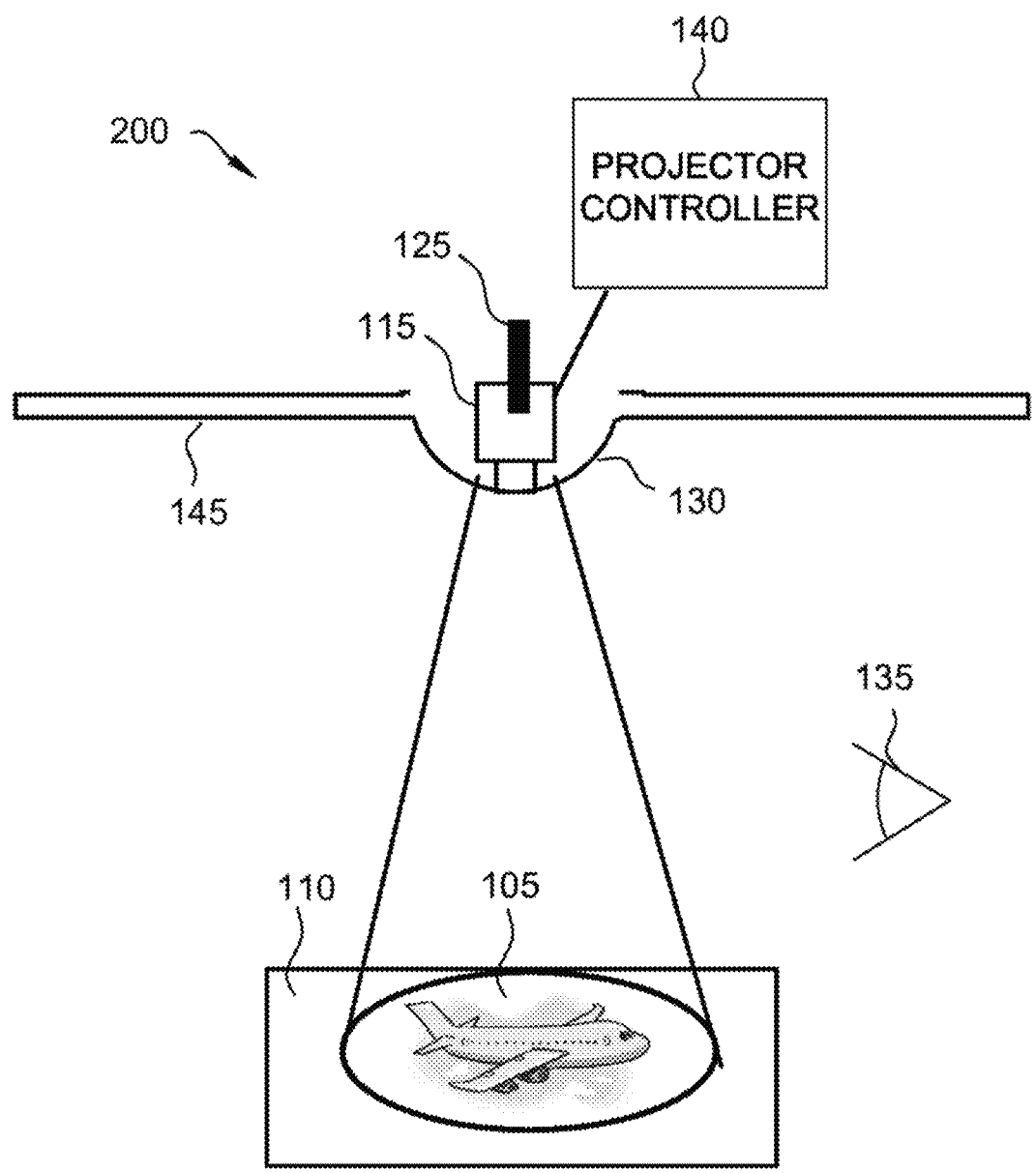
FIG. 2 illustrates a block diagram of another projector system for projecting an image onto a display surface in accordance with another example of the present disclosure.

FIG. 2 illustrates a block diagram of another projector system 200 for projecting an image 105 onto a display surface 110 in accordance with another example of the present disclosure. In projector system 200, projector 115 is attached to the gimbal 125 and rotates within a dome or other enclosed aperture 130. Projector 115 is configured to project images 105 onto a display surface 110. The projector controller 140 controls the projector 115 and the associated gimbal 125 to determine where the image 105 is projected. The dome or enclosed aperture 130 protects the projector 115 while allowing the projector a plurality of angles with which to project images 105.

FIG. 3 is a simplified block diagram of an example projector system 300 for executing the projector systems 100 and 200 (shown in FIGS. 1 and 2). In the example, the projector system 300 is used for controlling projectors 115. The projector system 300 is a projector controlling computer system that includes a projector controller computing device 310 (also known as a projector controller server) configured to project images onto surfaces. In some examples, the projector controller computing device 310 is programmed to control one or more projectors 115 based on data received from one or more sensors 305. In the example, projector controller computing device 310 is similar to projector controller 140 (shown in FIG. 1).

Projectors 115 are configured to project an image 105 onto a display surface 110 to be viewed by a viewer 135 (all shown in FIG. 1).

In projector system 300, sensors 305 receive signals about the actions of a user. The sensors 305 can include, but are not limited to, sensors to detect whether or not the tray table is deployed, sensors to detect a current position of the tray table, sensors to detect one or more objects on the display surface 110, sensors to detect a location and/or orientation of one or more objects to act as a display surface 110, and/or sensors to detect a position and/or presence of a passenger in the seat. Sensors 305 connect to projector controller computing device 310 through various wired or wireless interfaces including without limitation a network, such as a local area network (LAN) or a wide area network (WAN), dial-in-connections, cable modems, Internet connection, wireless, and special high-speed Integrated Services Digital Network (ISDN) lines. Sensors 305 receive data about the activities of the user or system and report those conditions to projector controller computing device 310. In other examples, sensors 305 are in communication with one or more client systems 325. In some examples, sensors 305 are in direct communication with one or more projectors 115, where the projectors 115 are directly activated based on the signals provided by the sensors 305. For example, a projector 115 can activate or change images 105 when a motion sensor detects movement. The sensors 305 can include, but are not limited to, proximity sensors, visual sensors, motion sensors, audio sensors, temperature sensors, RFID sensors, weight sensors, and/or any other type of sensor that allows the projector system 300 to operate as described herein.

In the example, client systems 325 are computers that include a web browser or a software application, which enables client systems 325 to communicate with projector controller computing device 310 using the Internet, a local area network (LAN), or a wide area network (WAN). In some examples, the client systems 325 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client systems 325 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. In at least one example, one or more client systems 325 are associated with vehicle operation, such as to display a current position of the vehicle along the vehicle's route. In another example, the client system 325 provides real-time information, such as financial news to the projector controller computing device 310; so that the projector controller computing device 310 can instruct one or more projectors 115 to display the financial news on a display surface 110. In the example, the projector controller computing device 310 is in communication with at least one additional client system 325, such as, but not limited to, an attendant computing system (panel) 335, the back of the seat infotainment system 330, and one or more content computer systems.

The attendant computing system 335 (also known as the attendant panel) is associated with the attendants and allows the attendants to control one or more features of the vehicle, such as, but not limited to, lighting and passenger communication. In these examples, the attendant computing system 335 is used to control one or more modes of the projector system 300. The attendant computing system 335 can also allow attendants to remotely turn projectors 115 off or on.

Furthermore, the projector system 300 can be a part of or in communication with a cabin environment network. The cabin environment network allows devices to connect to one or more systems of the aircraft. For example, the cabin environment network can connect to one or more client systems 325, such as computer devices used by attendants to track passenger orders or other information. The cabin environment network can also communicate with attendant computing system 335 and other devices, either through wireless or directly wired connections.

The back of the seat infotainment system 330 can include one or more controls for the projector system 300. These controls include, but are not limited to, turning the reading light on and off, adjusting the color and/or brightness of the reading light, disabling or enabling the dinner show, and accessing any other features available through the projector system 300. For example, the projector system 300 can project light for reading. The passenger can then use the back of the seat infotainment system 330 to adjust the brightness of or turn off the reading light provided by the projector system 300.

Content computer systems are client systems 325 that store video and images to be displayed through the projectors 115. For example, the video for the dinner show is stored on the content computer systems and then live streamed to the projector controllers 140 and projectors 115 in real-time to be displayed during the dinner show. By having the content stored in a single location, this reduces the amount of memory required for the projector system 300 and thus reduces the weight required. In some embodiments, content computer systems are similar to database server 315 and are in communication with one or more databases 320.

A database server 315 is communicatively coupled to a database 320 that stores data. In one example, the database 320 is a database that includes a plurality of projector settings, a plurality of projection sequences, and additional information for projection. In some examples, the database 320 is stored remotely from the projector controller computing device 310. In some examples, the database 320 is decentralized. In the example, a person can access the database 320 via the client systems 325 by logging onto projector controller computing device 310.

In addition, multiple projectors 115 can work together to project a unified image or other coordinated visual effect. One example of a unified image would be moving arrows that are projected on the floor, such as in an aisle, where the moving arrows move in a direction of the exit. The projector controller computing device 310 can communicate with multiple projectors 115 and/or multiple projector controllers 140 to coordinate between the multiple projectors 115 to display unified images or visual effects. For example, the projector controller computing device 310 can cause an individual figure and/or object move from being projected by a first projector 115 to being projected by a second projector 115 so that the image doesn't jump and is continuous. In this example, an individual figure in the dinner show could walk to or visit each seat in a row in turn.

Figure 4:
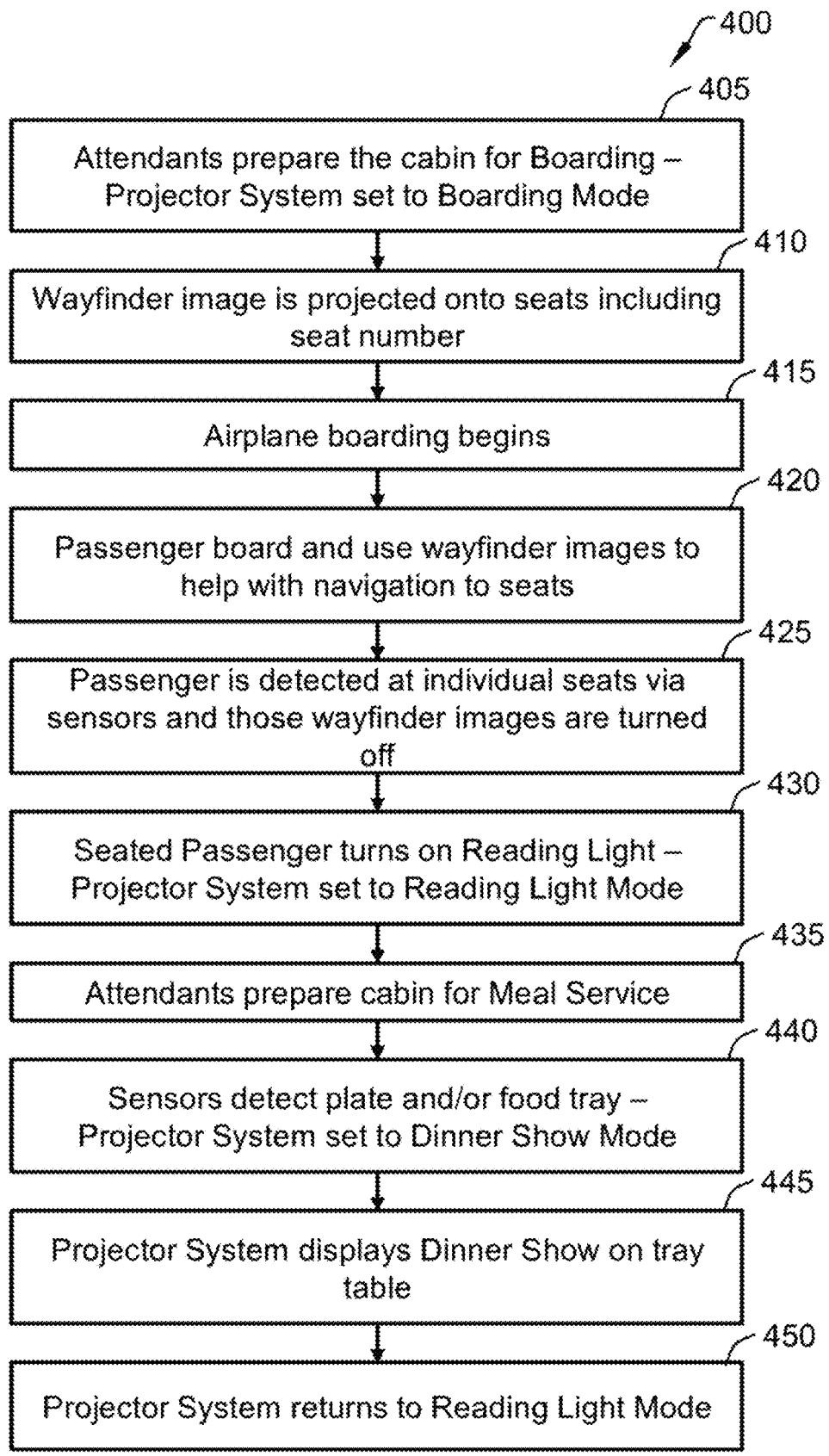
FIG. 4 illustrates a process for using the projector systems shown in FIGS. 1-3, in accordance with at least one example.

FIG. 4 illustrates a process 400 for using the projector systems 100, 200, and 300 (shown in FIGS. 1-3), in accordance with at least one example. Process 400 is implemented by at least one of a projector controller 140 (shown in FIG. 1) and a projector controller computing device 310 (shown in FIG. 3) programmed to control the projector systems 100, 200, and 300. The projector systems 100, 200, and 300 include one or more projectors 115 (shown in FIG. 1) configured to project onto one or more display surfaces 110 (shown in FIG. 1). While process 400 describes the use of a projector system 100, 200, and 300 in an aviation environment setting, the systems and methods described herein can also be used in vehicles, such as, but not limited to aircraft, watercraft, trains, buses, and spacecraft.

In some embodiments, a projector controller computing device 310 controls a single projector 115 associated with a single passenger seat. In other embodiments, a projector controller computing device 310 controls a plurality of projectors 115, such as those associated with the passenger seats in a row, a section, and/or any portion of the passenger seating area of the vehicle. In further examples, a projector controller computing device 310 is in communication with a plurality of projector controllers 140, where the projector controllers 140 communicate with the projectors 115.

At the beginning of process 400, the vehicle is preparing for boarding. An attendant sets 405 the projector system 300 to boarding mode, such as through an attendant computing system 335 (shown in FIG. 3). The projector controller computing device 310 receives the instruction to go to boarding mode from the attendant computing system (panel) 335. The projector controller computing device 310 instructs each projector 115 to display a wayfinder image 105 for each corresponding passenger seat. The projectors 115 each project 410 the wayfinder image 105 onto a display surface 110. The display surface 110 includes, but is not limited to, the floor in front of the seat, the seat cushion of the seat, the seatback, and/or the headrest. The wayfinder image 105 includes at least the seat number of the seat. The wayfinder image 105 can also include a welcome message and/or the name of the passenger that the seat is assigned to, such as from the passenger manifest information. The wayfinder image 105 can also include additional information for the passenger.

In step 415, boarding of the vehicle begins. The boarding passengers use 420 the wayfinder images 105 to help them determine which is their seat during the boarding process. When a passenger claims their seat, the sensors 305 detect 425 the passenger, such as through the use of a proximity sensor, weight sensor, or a visual sensor, and the projector controller computing device 310 instructs the projector 115 to stop displaying the wayfinder image 105.

In step 430, a seated passenger turns on the reading light for their seat. The projector controller computing device 310 instructs the projector 115 to project a reading light. The seated passenger can use a reading light button on the seat and/or a virtual button on the seat infotainment system 330 to turn on and control the reading light. At this point the projector system 300 is set to a reading light mode.

At a later point in the trip, the attendants prepare 435 the cabin for a meal service. In some examples, an attendant uses the attendant computing system 335 to set the projector controller computing device 310 to a dinner show mode. In preparing 435 the cabin for a meal service, meal trays are deployed. These can be tray tables that extend from a seatback, folding tables that are stored in arm rests, and/or any other table that can be used in the vehicle during meal service. In some first-class cabins, white (or other lightly colored linen tablecloths) can cover the deployed tables. A white or other lightly colored plate is also placed on the table. In some examples, a food tray is placed on the table.

The sensors 305 detect 440 the plate and/or food tray. In some examples, detecting 440 the plate and/or food tray, triggers the dinner show mode. The projector system 300 displays 445 the dinner show on the table. The projector system 300 can adjust the display 445 of the dinner show based on the current location of the table/tray/plate to be appropriately positioned so that the seated passenger can properly view the dinner show. For example, the dinner show can include animation and/or video that occurs in or around the plate or tray itself, and the projector controller computing device 310 adjusts the projection of the image 105 by moving the gimbal 125 (shown in FIG. 1). For example, a user can have adjusted the position of the table for their own comfort and the sensors 305 tell the projector system 300 where to project the image 105 based on the adjusted position. Once the dinner show is complete, the projector system 300 returns 450 to reading light mode.

In some examples, the dinner show plays at the exact same time for all of the passengers in the cabin. In other examples, the dinner show plays for each passenger based on when their tray table is properly set for the dinner show. In still other examples, the dinner show is run for different groups of passengers at different times, such as those in the first-class or business-class cabins versus those in the economy cabin. Furthermore, the different cabins can have different dinner shows displayed. These can be adjusted versions based on different table sizes and/or different dinning set-ups. The dinner show can also be accompanied by a corresponding audio track.

Furthermore, different dinner shows can be played for different meals. Ones having skill in the art would also determine that different shows can also be played at different points in the flight, such as during safety briefings, take-off, landing, beverage services, duty-free shopping, and/or other times to improve the passenger experience.

Figure 5:
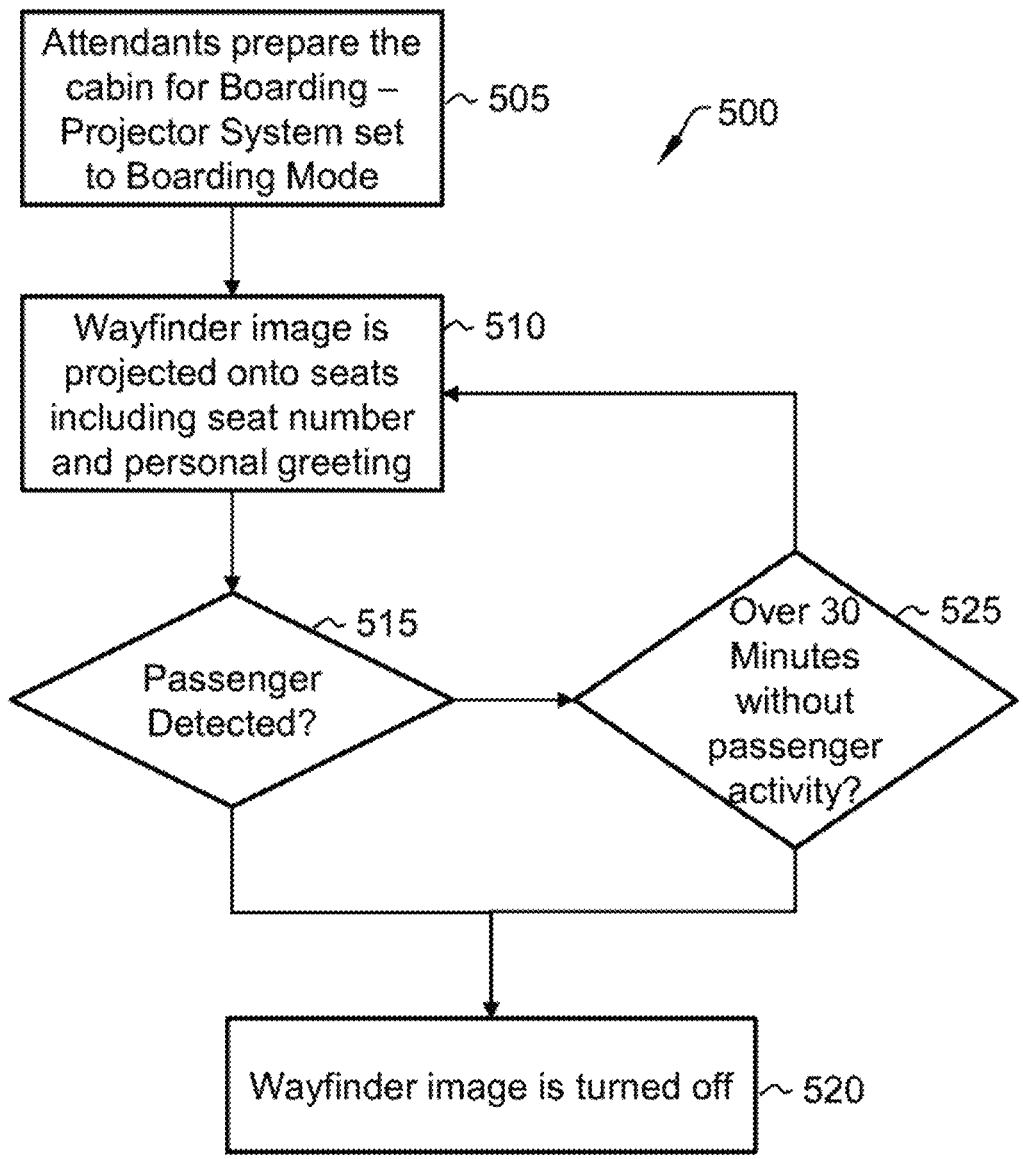
FIG. 5 illustrates a process for using the projector system shown in FIG. 3 in a first mode.

FIG. 5 illustrates a process 500 for using the projector system 300 (shown in FIG. 3) in a first mode. The first mode is a boarding mode, where the projector system 300 is used to assist passengers with the boarding process.

The attendants prepare the cabin for boarding, including setting 505 the projector system 300 to the boarding mode. An attendant can instruct the projector controller computing device 310 to change to boarding mode via the attendant computing system 335 (shown in FIG. 3). The projector controller computing device 310 instructs the projectors 115

(shown in FIG. 1) to project 510 a wayfinder image 105 (shown in FIG. 1) onto a display surface 110 (shown in FIG. 1). The wayfinder image includes at least a seat number. The wayfinder image 105 can also include, but is not limited to, a personal greeting, a welcome message, the name of the passenger that the seat is assigned to, such as from the passenger manifest information, and/or information about the seat itself, such as class of seat, whether it is an exit row, and/or if the seat reclines. The wayfinder image 105 can also include additional information for the passenger. The display surface 110 includes, but is not limited to, the floor in front of the seat, the seat cushion of the seat, the seatback, the headrest, armrest, sidewall lining, and/or top of suite walls, etc. Passengers can use the wayfinder images 105 to determine which is their seat.

The sensors 305 (shown in FIG. 3) continually monitor the seat to detect 515 if a passenger has taken the seat. When a passenger claims their seat, the sensors 305 detect 425 the passenger, such as through the use of a proximity sensor, weight sensor, or a visual sensor. The sensors 305 can be configured to detect the difference between a passenger sitting down in the seat and a passenger that is just moving across the seat, such as an aisle seat, to get to their seat.

If a passenger is detected in the seat, then the projector controller computing device 310 turns 520 the wayfinder image 105 off. If no passenger is in the seat, then the projector controller computing device 310 determines 520 how long that the seat has been empty. If the seat has been empty for a predetermined period of time, such as, but not limited to, thirty minutes, the projector controller computing device 310 turns 520 the wayfinder image 105 off and puts the projector 115 associated with that seat into a sleep mode. In further examples, the projector controller computing device 310 can determine that the boarding process is complete and use that as the determination to have the projector 115 for that seat go into sleep mode. The projector controller computing device 310 can also have the projector 115 go into sleep mode when no one is in the seat and the attendant computing system 335 changed the mode to the reading mode to indicate that boarding is complete.

In some further examples, the projector controller computing device 310 awakens from the sleep mode when a passenger is later detected in the seat. This can be a passenger who moved seats after boarding has completed.

Figure 6:
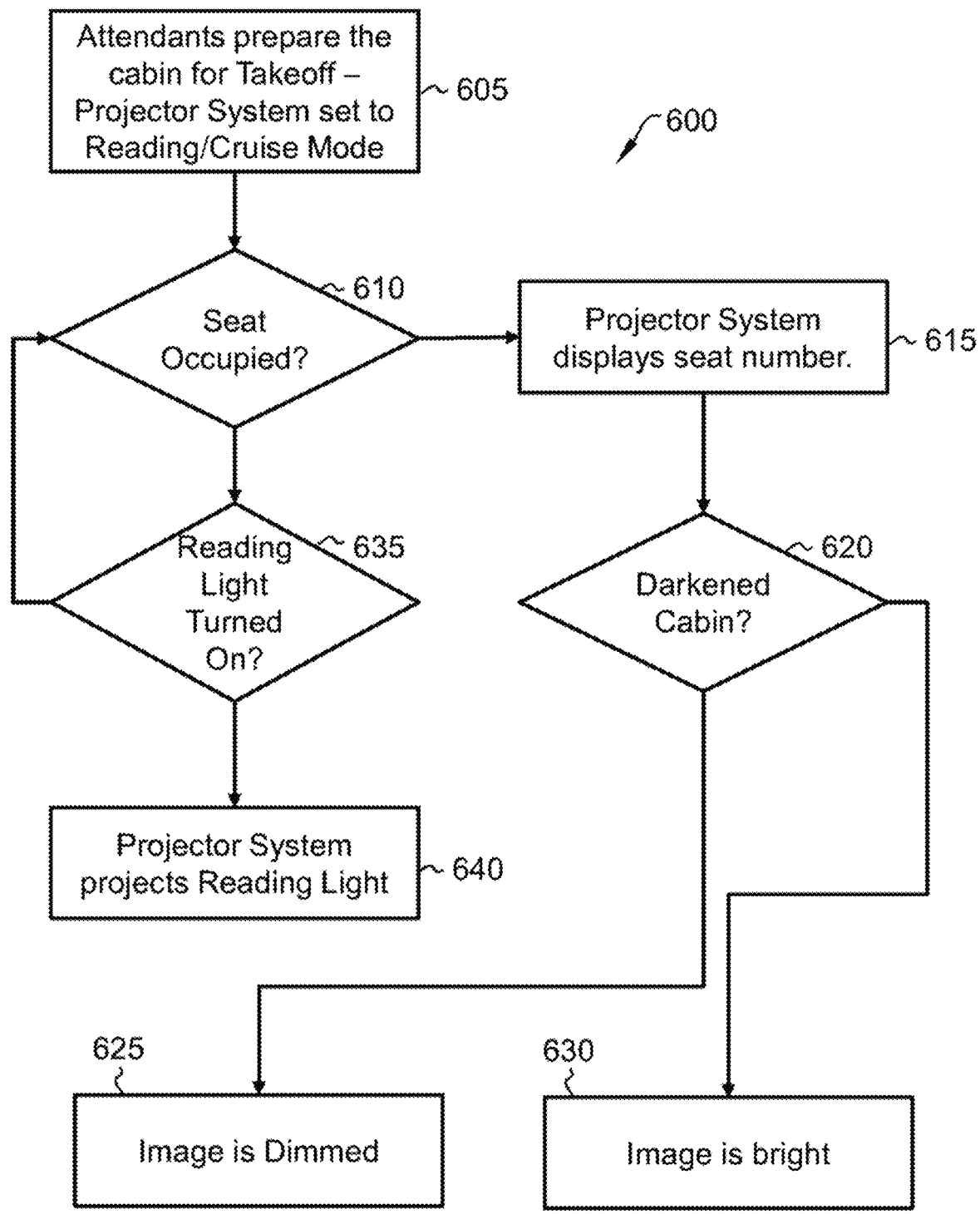
FIG. 6 illustrates a process for using the projector system shown in FIG. 3 in a second mode.

In some examples, the projector controller computing device 310 switches to the reading light mode in Step 525, as further described in FIG. 6 and process 600, when the passenger is detected in the seat.

FIG. 6 illustrates a process 600 for using the projector system 300 (shown in FIG. 3) in a second mode. The second mode is a reading light or cruising mode, where the projector system 300 is used to assist passengers' enjoyment of travel.

The attendants prepare the cabin for take-off or travel, including setting 605 the projector system 300 to the reading light or cruising mode. An attendant can instruct the projector controller computing device 310 to change to reading light or cruising mode via the attendant computing system 335 (shown in FIG. 3). The projector controller computing device 310 uses the sensors 305 (shown in FIG. 3) to determine 610 if each seat is occupied. If the seat is not occupied, the projector controller computing device 310 instructs the corresponding projector 115 (shown in FIG. 1) to project 615 a seat number image 105 (shown in FIG. 1) onto the seat. The seat number image 105 can be projected onto a display surface 110 including, but not limited to, the floor in front of the seat, the seat cushion of the seat, the seatback, and/or the headrest. This allows passengers who have left their seat, such as to go to the lavatories, to easily determine which seat is there, especially in a darkened cabin.

The projector controller computing device 310 determines 620 if the cabin has been darkened, such as from one or more settings from the attendant computing system 335. If the cabin had been darkened, the projector controller computing device 310 instructs 625 the projector 115 to project a dimmed version of the seat number image 105. If the cabin has not been darkened, the projector controller computing device 310 instructs 630 the projector 115 to project a regular version of the seat number image 105.

If the projector controller computing device 310 determines 610 that the seat is occupied, the projector controller computing device 310 determines 635 if the passenger has turned on their reading light. The projector controller computing device 310 can receive a signal to turn on or off the reading light from a physical reading light button in the passenger's seat or armrests.

The projector controller computing device 310 can also receive a signal to control the reading light from the back of seat infotainment system 330 (shown in FIG. 3). The signals can include, but are not limited to, on/off, brightness level, color, object tracking, light focus and/or autofocus. The projector controller computing device 310 instructs the projector 115 to project 640 a reading light for the passenger. As the projector 115 has more projection options that the normal bulb or LED-based reading light, the projector 115 can project the reading light with a plurality of options. In addition, to activating/deactivating, the projector 115 can change the brightness of the reading light, change the color of the reading light, and use the sensors 305 to project an image tracking reading light. By using the sensors 305, the projector controller computing device 310 can determine a current location of reading material or another object that the passenger wishes to have illuminated. For example, the passenger is reading a paperback book that they are currently holding. The sensors 305 can determine the current location, shape, size, and orientation of the book. Then the projector controller computing device 310 can instruct the projector 115 to project the reading light so that the reading light shines directly on the book itself and not on other objects. This more targeted reading light would then prevent light spillover or illumination from reflecting into the neighboring seats as much. Furthermore, the passenger could also adjust the diameter of the reading light, to provide, for example, a smaller spotlight, or a larger light spread.

Figure 7:
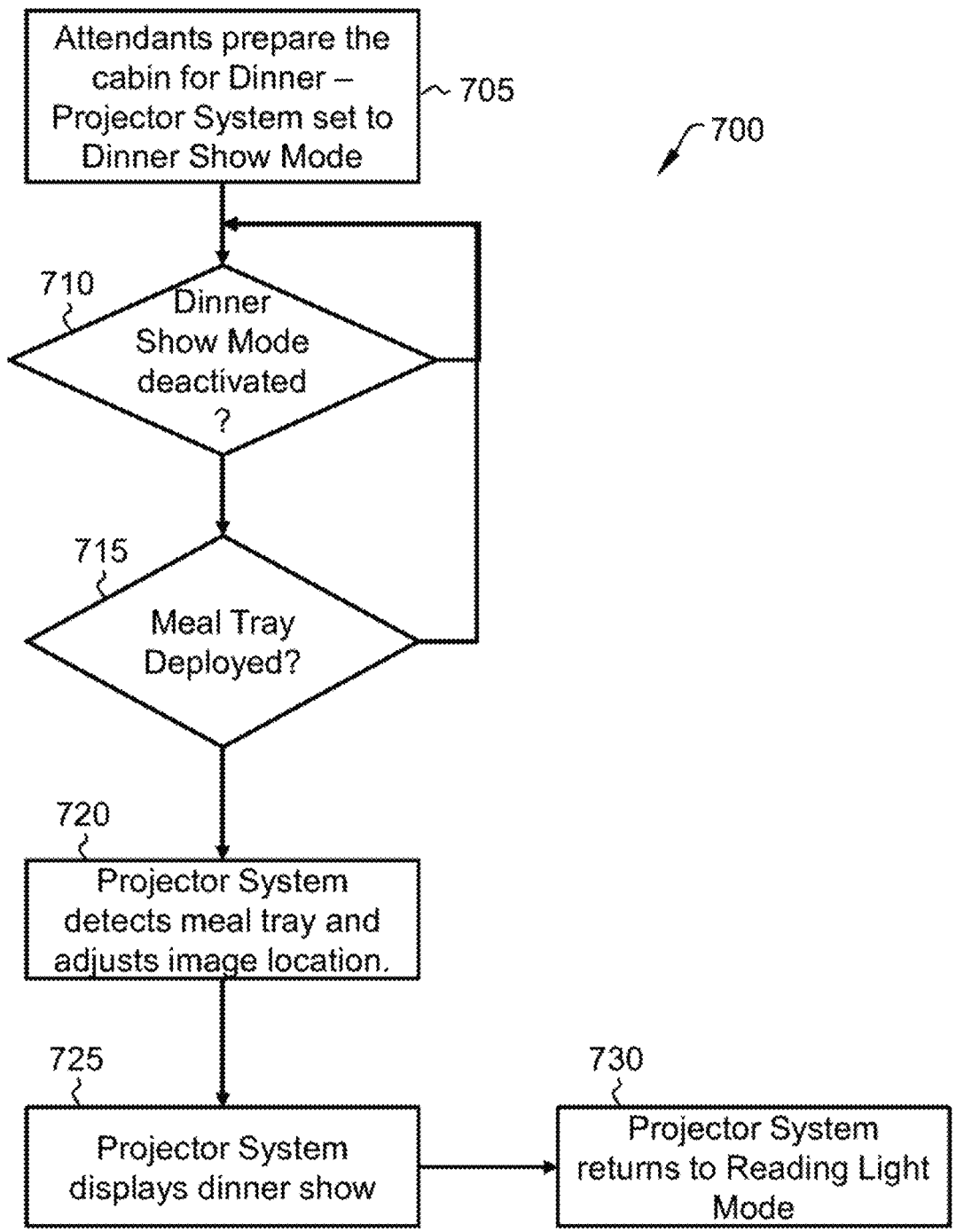
FIG. 7 illustrates a process for using the projector system shown in FIG. 3 in a third mode.

FIG. 7 illustrates a process for using the projector system 300 (shown in FIG. 3) in a third mode. The third mode is a dinner show mode, where the projector system 300 is used to assist passengers' enjoyment of a meal.

The attendants prepare 435 the cabin for a meal service, including setting 705 the projector system 300 to the dinner show mode. An attendant can instruct the projector controller computing device 310 to change to dinner show mode via the attendant computing system 335 (shown in FIG. 3).

In preparing the cabin for a meal service, meal trays are deployed. These can be tray tables that extend from a seatback, folding tables that are stored in arm rests, and/or any other table that can be used in the vehicle during meal service. In some first-class cabins, white (or other lightly colored linen tablecloths) can cover the deployed tables. A white or other lightly colored plate is also placed on the table. In some examples, a food tray is placed on the table.

For each seat, the projector controller computing device 310 (shown in FIG. 3) determines 610 if the dinner mode has been deactivated by the passenger. The passenger can deactivate the dinner show mode at any time by changing a setting in their back of the seat infotainment system 330 (shown in FIG. 3). The passenger can also deactivate the dinner show mode by pressing a physical button, such as the attendant call button, when the dinner show begins.

If the projector controller computing device 310 determines 710 that the dinner show mode has been disabled for a seat, then the projector controller computing device 310 instructs the projector 115 (shown in FIG. 1) not to take any actions for the dinner show. However, if the user activates the dinner show mode for their seat, the projector controller computing device 310 will activate process 700 at the current point in the dinner show, such as if the show is already in progress, the projector controller computing device 310 will pick up at the current point in the show.

If the projector controller computing device 310 determines 710 that the dinner show mode has not been disabled for a seat, then the projector controller computing device 310, determines 715 if the meal tray is deployed. Sensors 305 detect 720 the tray table and/or a plate or food tray on the tray table. In some examples, detecting 720 one or more of the tray table, the plate, and/or food tray, triggers the dinner show mode. The projector controller computing device 310 determines the current location of the plate, meal tray, and/or tray table and instructs 720 the projector 115 to adjust the image 105 to be projected based on that detected current location. The projector 115 projects 725 the dinner show based on the adjusted location for the image 105. The projector controller computing device 310 adjusts the display 725 of the dinner show based on the current location of the table/tray/plate to be appropriately positioned so that the seated passenger can properly view the dinner show. For example, the dinner show can include animation and/or video that occurs in the plate or tray itself, and the projector controller computing device 310 adjusts the projection of the image 105 by moving the gimbal 125 (shown in FIG. 1). For example, a user can have adjusted the position of the table for their own comfort and the sensors 305 tell the projector controller computing device 310 where to project the image 105 based on the adjusted position. Once the dinner show is complete, the projector controller computing device 310 returns 730 to reading light mode.

In some examples, the dinner show plays at the exact same time for all of the passengers in the cabin. In other examples, the dinner show plays for each passenger based on when their tray table is properly set for the dinner show. In still other examples, the dinner show is run for different groups of passengers at different times, such as those in the first-class cabin versus those in the economy cabin. Furthermore, the different cabins can have different dinner shows displayed. These can be adjusted versions based on different table sizes and/or different dinning set-ups.

Furthermore, different dinner shows can be played for different meals. Ones having skill in the art would also determine that the shows can also be played at different points in the flight, such as during safety briefings, take-off, landing, beverage services, duty-free shopping, and/or other times to improve the passenger experience.

While processes 400, 500, 600, and 700 describe the use of the projector system 300 in a aircraft setting, the systems and methods described herein can also be used in vehicles, such as, but not limited to aircraft, watercraft, trains, buses, and spacecraft, and on other surfaces in the vehicle, such as, but not limited to, at passenger seats (e.g., tray tables), in galleys (e.g., work decks and sinks) helping with meal prep and other instructions, the flight deck, cross aisles (such as next to the exit doors, passenger entryways (e.g., ceilings, floors, and walls), lavatories (e.g., baby changing stations, sinks, and walls), bar units (e.g., the countertops and fronts), and any other visible surface of the vehicle. Furthermore, these systems and methods would also be applicable to other environments, such as, but not limited to, bathrooms in homes and businesses (or hotels), kitchens, dining rooms, and other public areas of homes, businesses, or hotels. While passenger seating is used as an example implementation herein, after reading this specification it will be recognized other implementations and applications are within the scope of the present disclosure, including but not limited to other stowable support surfaces such as trays, tables, workstations, among others.

Furthermore, the different sequences of processes 400, 500, 600, and 700 can be triggered in a different order based on the user's actions. Furthermore, one or more of the sequences can be triggered based on additional sensors 305 present in the seating environment, which can trigger other projection sequences.

Figure 8:
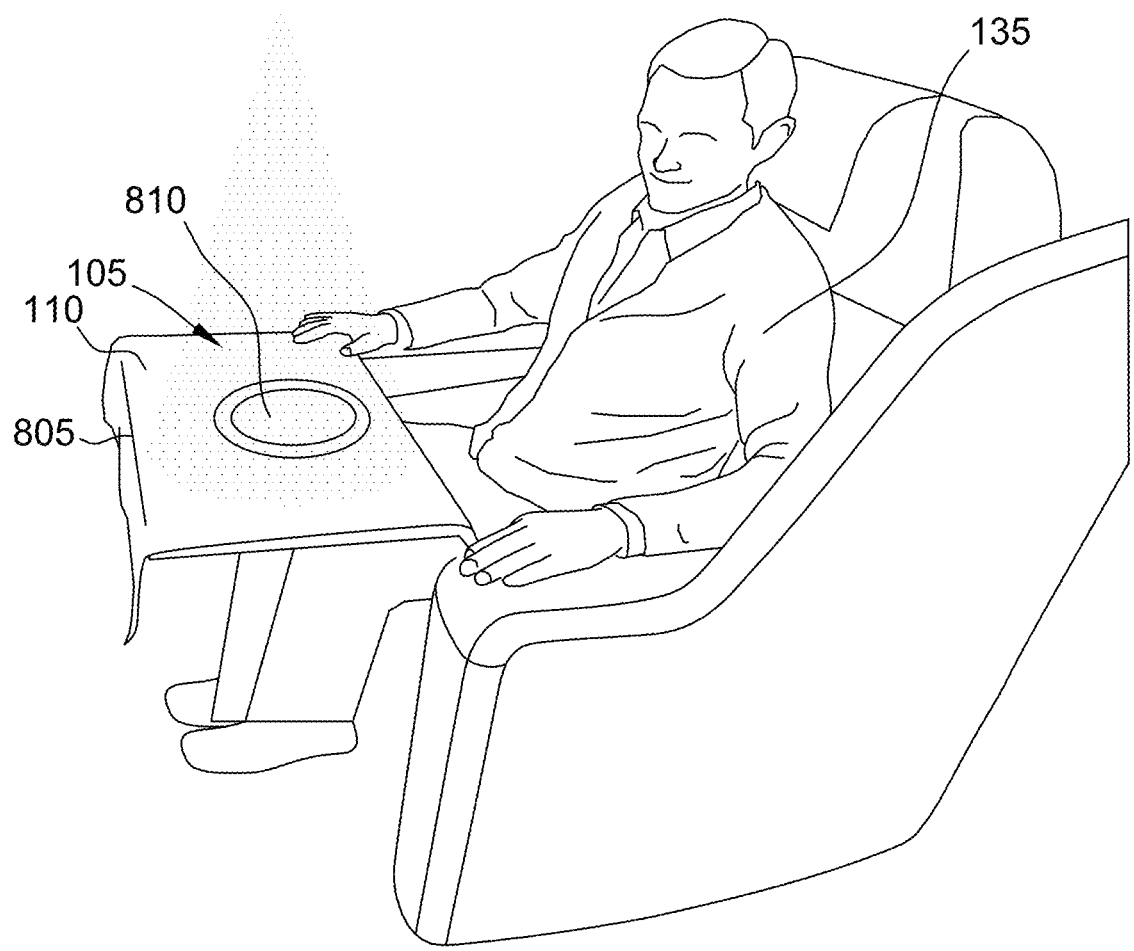
FIG. 8 illustrates a projector projecting onto a display surface of a tray table.

FIG. 8 illustrates a projector 115 projecting onto a display surface 110 of a tray table 805. In FIG. 8, the projector 115 projects an image 105 onto a tray table 805, which acts as a display surface 110. In FIG. 8, the image 105 is located on the tray table 805 based on a current position of an object 810, such as a plate 810, placed on the tray table 805.

Figure 9:
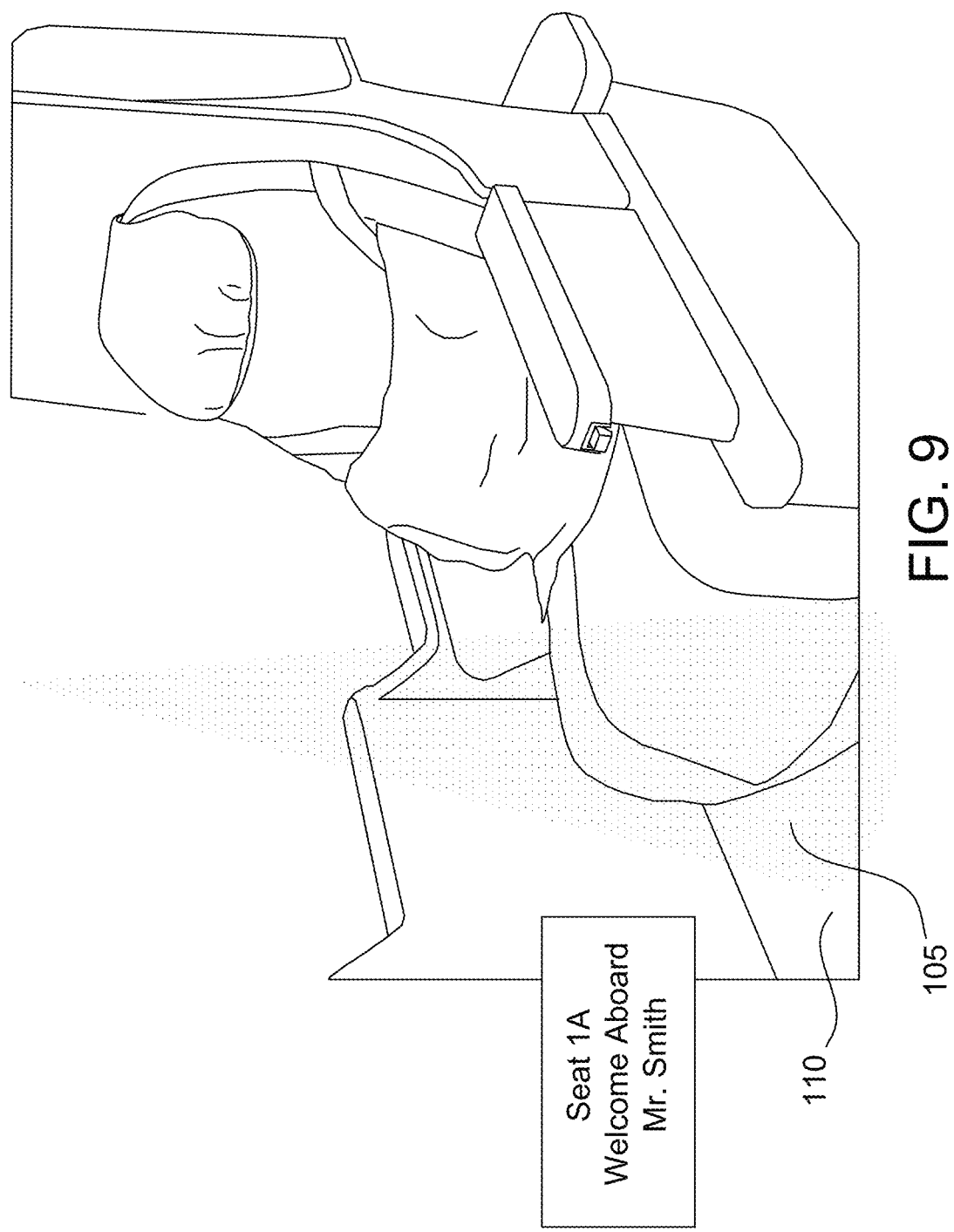
FIG. 9 illustrates a first location for a projection of a seat number and/or greeting for use during a boarding mode.

FIG. 9 illustrates a first location for a projection of a seat number and/or greeting for use during a boarding mode. In FIG. 9, the image 105 is projected onto the floor as the display surface 110.

Figure 10A:
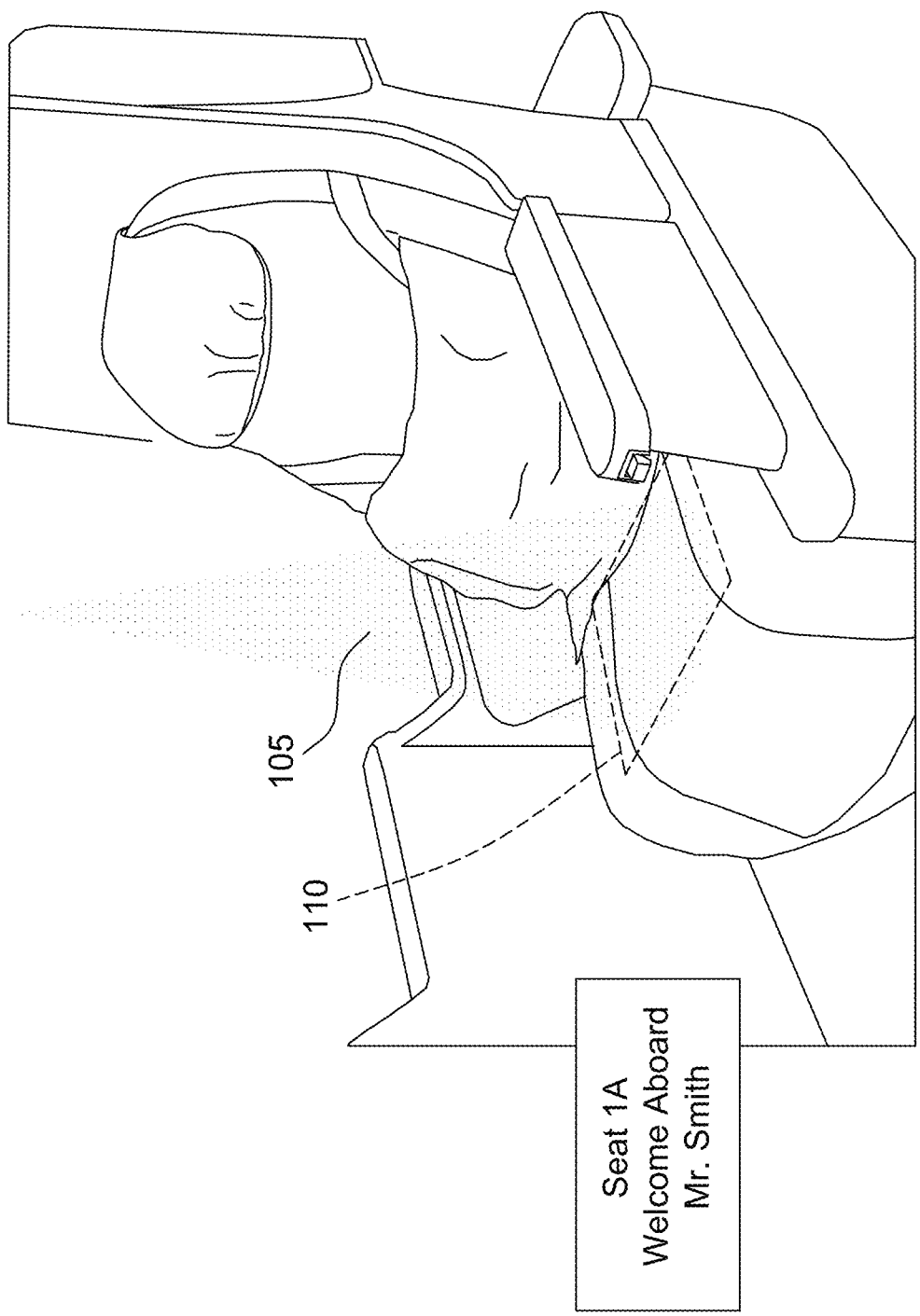
FIG. 10A illustrates a second location for a projection of a seat number and/or greeting for use during a boarding mode.

FIG. 10A illustrates a second location for a projection of a seat number and/or greeting for use during a boarding mode. In FIG. 10A, the image 105 is projected onto the seat cushion (or seat base, or seat squab) as the display surface 110.

Figure 10B:
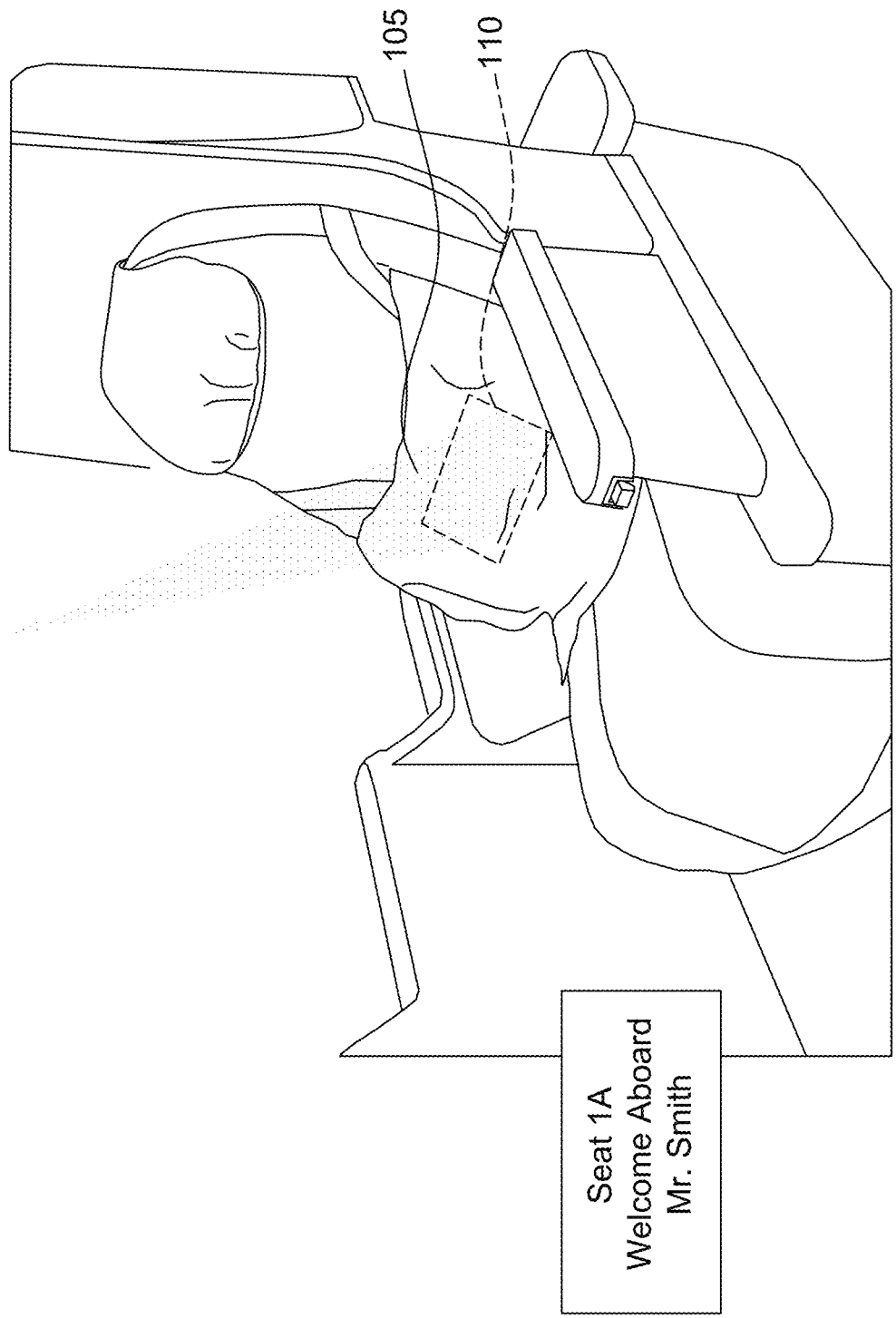
FIG. 10B illustrates a third location for a projection of a seat number and/or greeting for use during a boarding mode.

FIG. 10B illustrates a third location for a projection of a seat number and/or greeting for use during a boarding mode. In FIG. 10B, the image 105 is projected onto the seat back as the display surface 110.

Figure 11A:
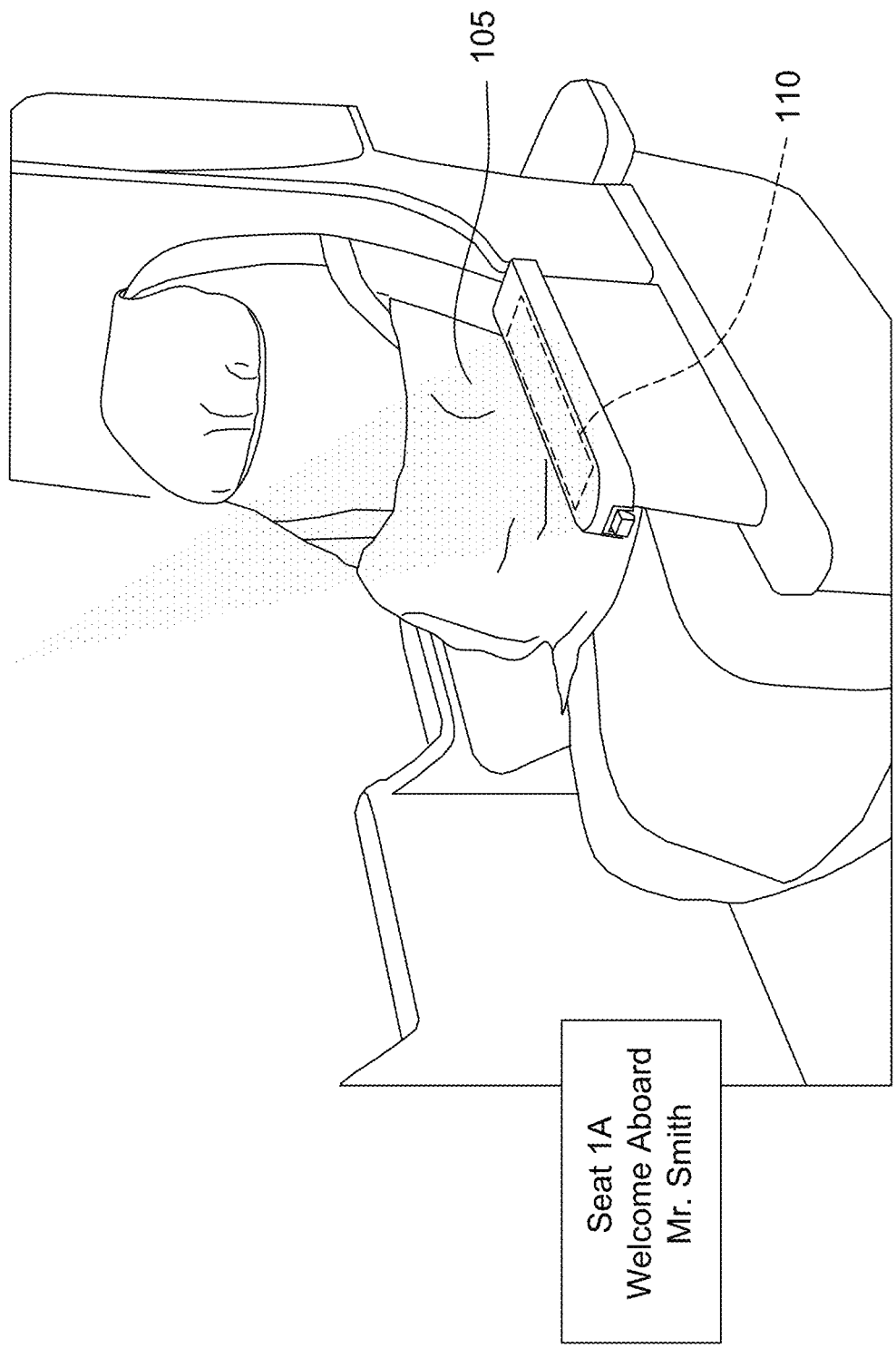
FIG. 11A illustrates a fourth location for a projection of a seat number and/or greeting for use during a boarding mode.

FIG. 11A illustrates a fourth location for a projection of a seat number and/or greeting for use during a boarding mode. In FIG. 11A, the image 105 is projected onto the arm rest as the display surface 110.

Figure 11B:
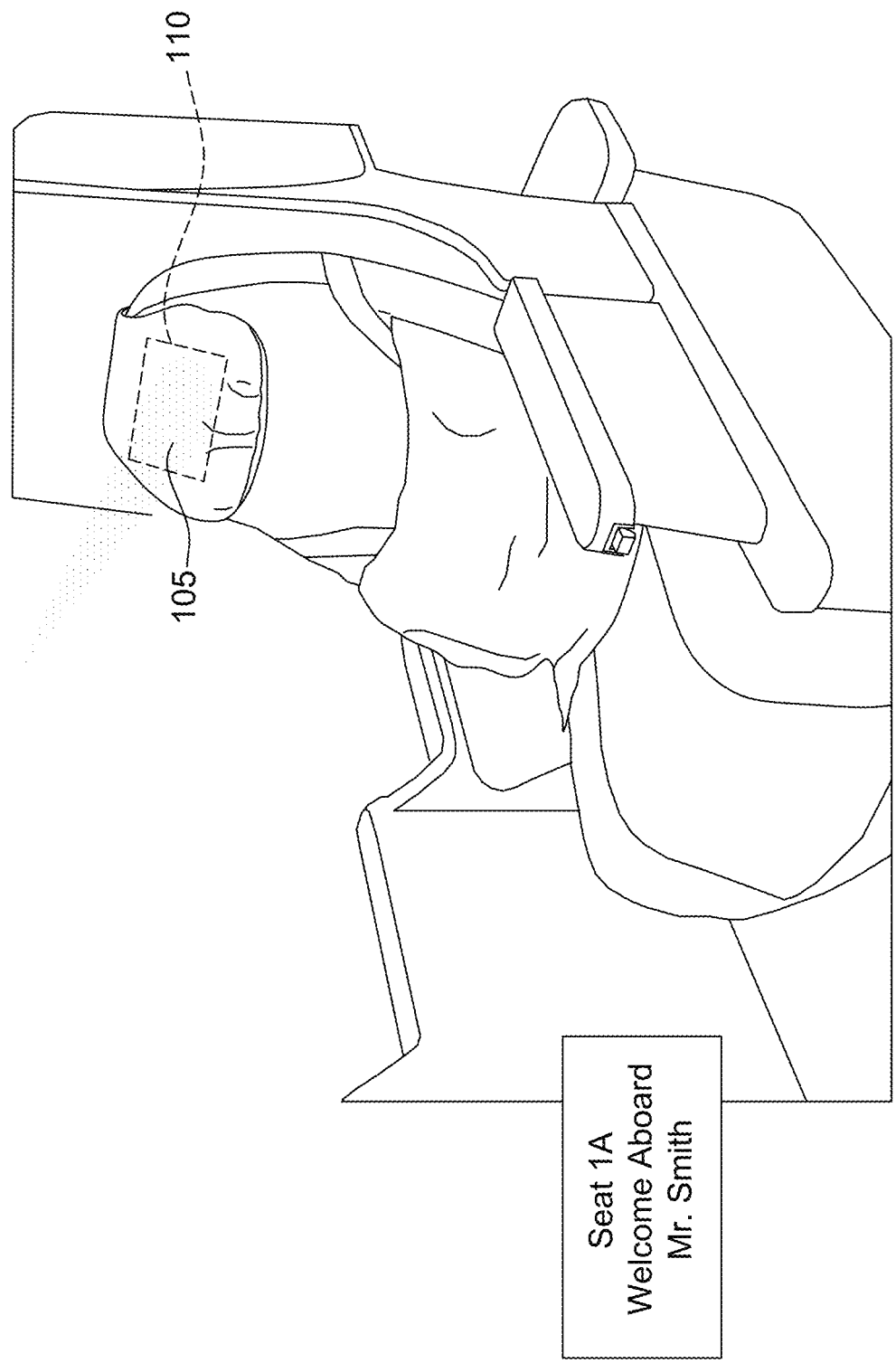
FIG. 11B illustrates a fifth location for a projection of a seat number and/or greeting for use during a boarding mode.

FIG. 11B illustrates a fifth location for a projection of a seat number and/or greeting for use during a boarding mode. In FIG. 11B, the image 105 is projected onto the headrest as the display surface 110.

Figure 12A:
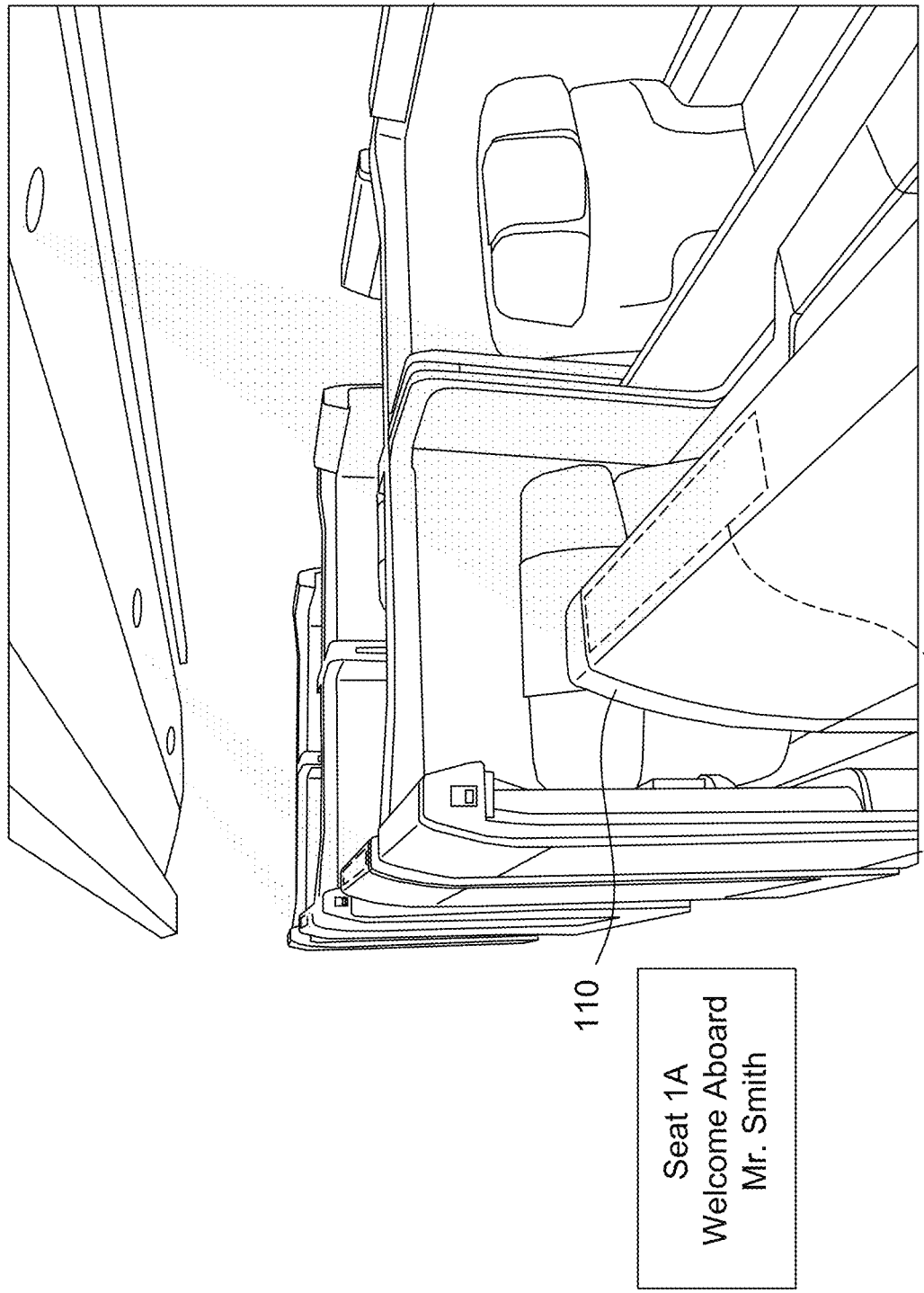
FIG. 12A illustrates a first suite wall location for a projection of a seat number and/or greeting for use during a boarding mode.

FIG. 12A illustrates a first suite wall location for a projection of a seat number and/or greeting for use during a boarding mode. In FIG. 12A, the image 105 is projected onto the top of a suite wall as the display surface 110.

Figure 12B:
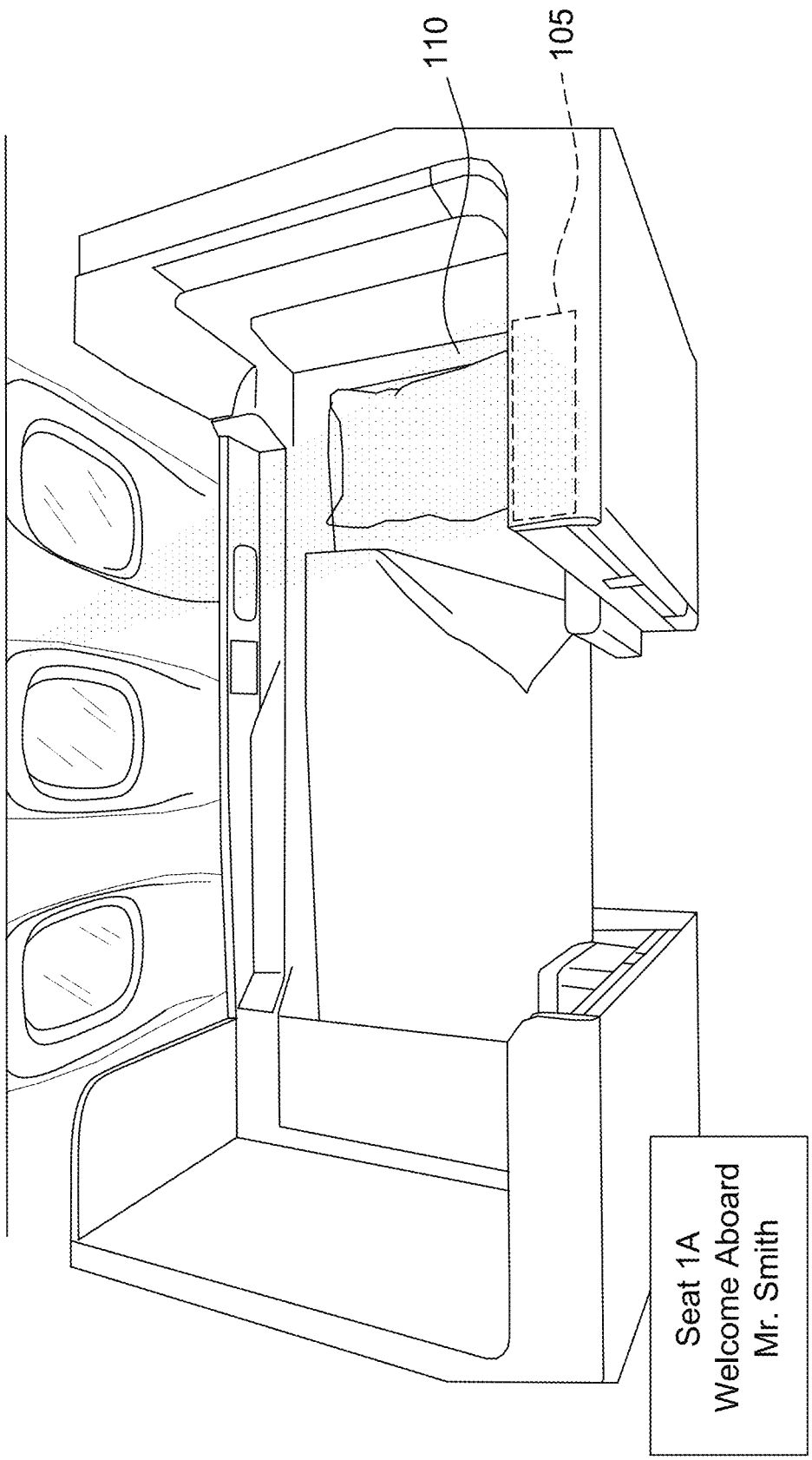
FIG. 12B illustrates a second suite wall location for a projection of a seat number and/or greeting for use during a boarding mode.

FIG. 12B illustrates a second suite wall location for a projection of a seat number and/or greeting for use during a boarding mode. In FIG. 12B, the image 105 is projected onto the top of a suite wall as the display surface 110.

Figure 12C:
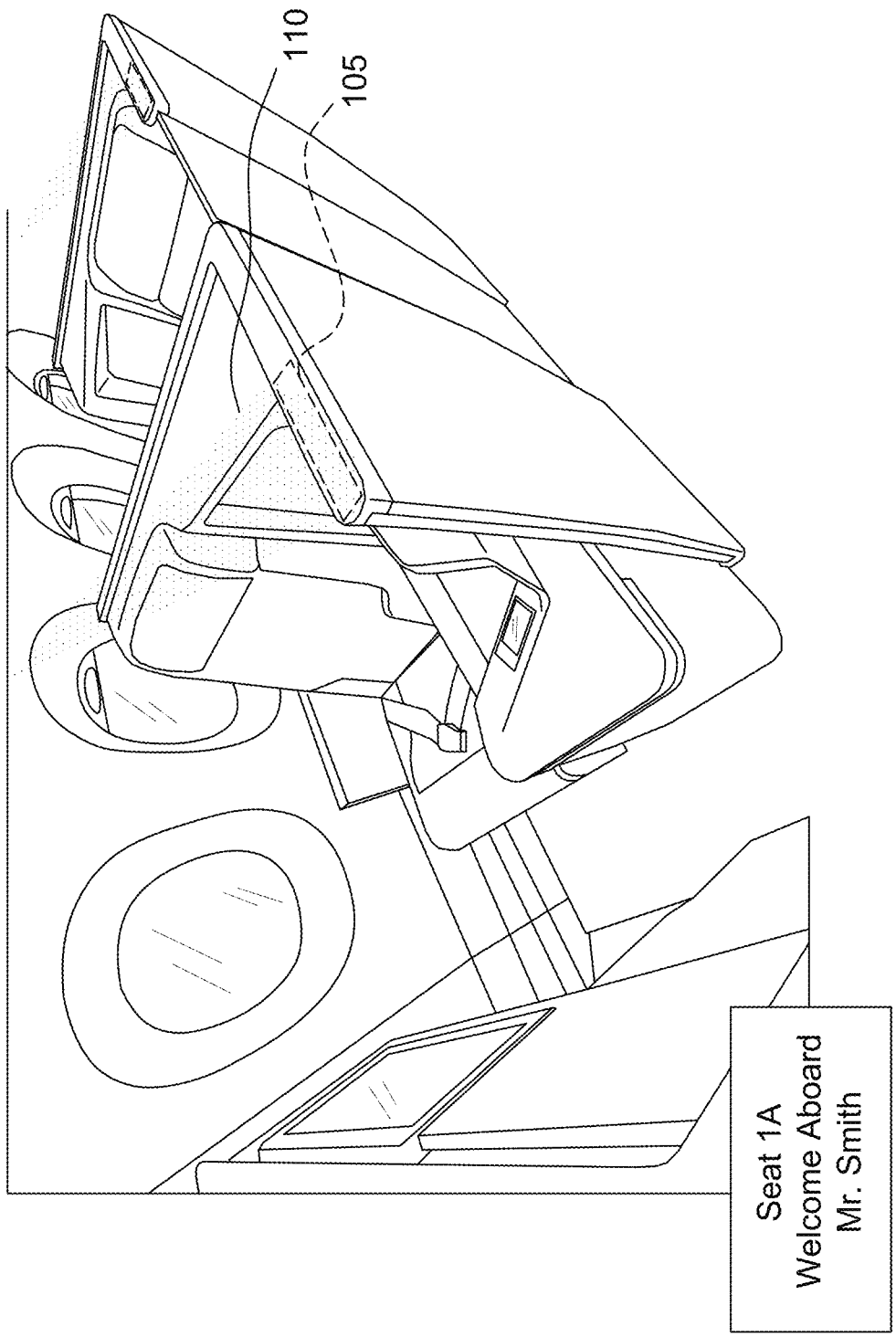
FIG. 12C illustrates a third suite wall location for a projection of a seat number and/or greeting for use during a boarding mode.

FIG. 12C illustrates a third suite wall location for a projection of a seat number and/or greeting for use during a boarding mode. In FIG. 12C, the image 105 is projected onto the top of a suite wall as the display surface 110.

In FIGS. 9-12C, the seat number image or wayfinder image 105 includes information including the seat number, a welcome message, and the name of the passenger that has been assigned that seat. This information is only for example purposes and other information can be provided as desired. Furthermore, the projector 115 can project the seat number onto the seat in multiple locations and in different configurations at different times during the trip. For example, the projector 115 projects the seat number, passenger name, and welcome message on the seatback, arm rest, and headrest during boarding. Then the projector 115 projects the seat number and name onto the seat cushion, arm rest, and floor during cruising, such as when the passenger gets up from their seat during the trip.

Figure 13:
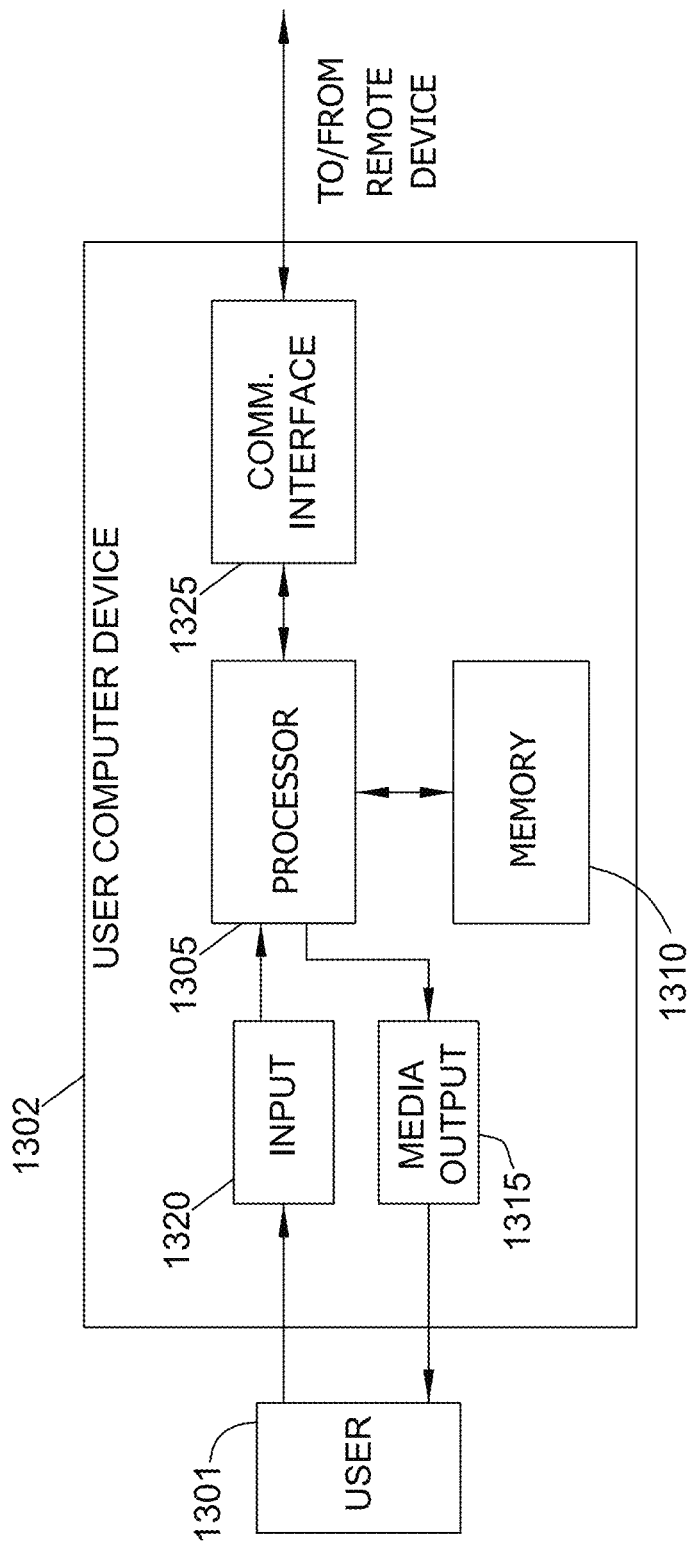
FIG. 13 illustrates an example configuration of user computer device used in the projector system shown in FIG. 3, in accordance with one example of the present disclosure.

FIG. 13 illustrates an example configuration of user computer device 1302 used in the projector system 300 (shown in FIG. 3), in accordance with one example of the present disclosure. User computer device 1302 is operated by a user 1301. The user computer device 1302 can include, but is not limited to, the projector 115 (shown in FIG. 1), the sensor 305, the client system 325, the back of the seat infotainment system 330, and the attendant computing system 335 (all shown in FIG. 3). The user computer device 1302 includes a processor 1305 for executing instructions. In some examples, executable instructions are stored in a memory area 1310. The processor 1305 can include one or more processing units (e.g., in a multi-core configuration). The memory area 1310 is any device allowing information such as executable instructions and/or transaction data to be stored and retrieved. The memory area 1310 can include one or more computer-readable media.

The user computer device 1302 also includes at least one media output component 1315 for presenting information to the user 1301. The media output component 1315 is any component capable of conveying information to the user 1301. In some examples, the media output component 1315 includes an output adapter (not shown) such as a video adapter and/or an audio adapter. An output adapter is operatively coupled to the processor 1305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some examples, the media output component 1315 is configured to present a graphical user interface (e.g., a web browser and/or a client application) to the user 1301. A graphical user interface can include, for example, an interface for viewing the projection sequences. In some examples, the user computer device 1302 includes an input device 1320 for receiving input from the user 1301. The user 1301 can use the input device 1320 to, without limitation, select a mode. The input device 1320 can include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen can function as both an output device of the media output component 1315 and the input device 1320.

The user computer device 1302 can also include a communication interface 1325, communicatively coupled to a remote device such as the projector controller computing device 310 (shown in FIG. 3), one or more sensors 305, and one or more projectors 115. The communication interface 1325 can include, for example, a wired or wireless network adapter and/or a wireless data transceiver for use with a mobile telecommunications network.

Stored in the memory area 1310 are, for example, computer-readable instructions for providing a user interface to the user 1301 via the media output component 1315 and, optionally, receiving and processing input from the input device 1320. A user interface can include, among other possibilities, a web browser and/or a client application. Web browsers enable users, such as the user 1301, to display and interact with media and other information typically embedded on a web page or a website from the projector controller computing device 310. A client application allows the user 1301 to interact with, for example, the projector controller computing device 310. For example, instructions can be stored by a cloud service, and the output of the execution of the instructions sent to the media output component 1315.

The processor 1305 executes computer-executable instructions for implementing aspects of the disclosure.

Figure 14:
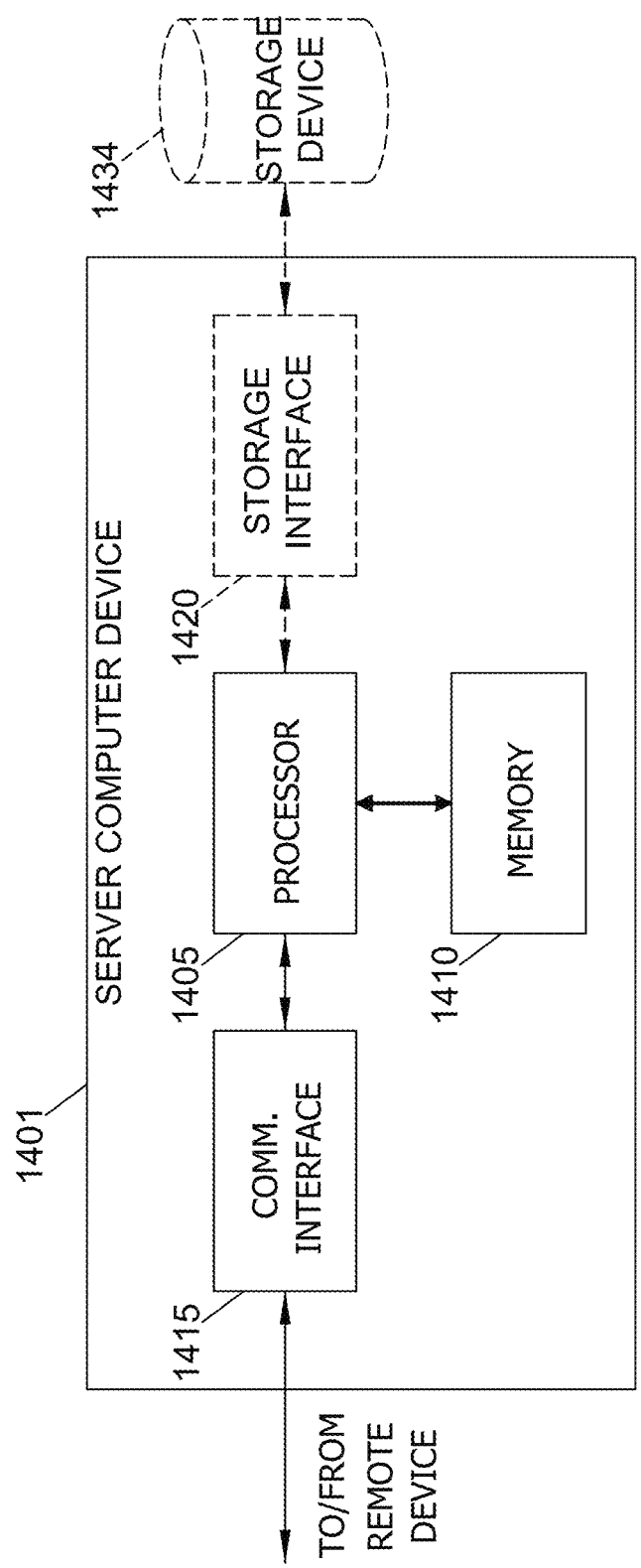
FIG. 14 illustrates an example configuration of a server computer device used in the projector system shown in FIG. 3, in accordance with one example of the present disclosure.

FIG. 14 illustrates an example configuration of a server computer device 1401 used in the projector system 300 (shown in FIG. 3), in accordance with one example of the present disclosure. Server computer device 1401 can include, but is not limited to, the projector controller 140 (shown in FIG. 1), the projector controller computing device 310, the database server 315, and the attendant computing system 335 (all shown in FIG. 3). The server computer device 1401 also includes a processor 1405 for executing instructions. Instructions can be stored in a memory area 1410. The processor 1405 can include one or more processing units (e.g., in a multi-core configuration).

The processor 1405 is operatively coupled to a communication interface 1415 such that the server computer device 1401 is capable of communicating with a remote device such as another server computer device 1401, another projector controller computing device 310, or the client system 325 (shown in FIG. 3). For example, the communication interface 1415 can receive requests from the client system 325 via the Internet, as illustrated in FIG. 3.

The processor 1405 can also be operatively coupled to a storage device 1434. The storage device 1434 is any computer-operated hardware suitable for storing and/or retrieving data, such as, but not limited to, data associated with the database 320 (shown in FIG. 3). In some examples, the storage device 1434 is integrated in the server computer device 1401. For example, the server computer device 1401 can include one or more hard disk drives as the storage device 1434. In other examples, the storage device 1434 is external to the server computer device 1401 and can be accessed by a plurality of server computer devices 1401. For example, the storage device 1434 can include a storage area network (SAN), a network attached storage (NAS) system, and/or multiple storage units such as hard disks and/or solid-state disks in a redundant array of inexpensive disks (RAID) configuration.

In some examples, the processor 1405 is operatively coupled to the storage device 1434 via a storage interface 1420. The storage interface 1420 is any component capable of providing the processor 1405 with access to the storage device 1434. The storage interface 1420 can include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1405 with access to the storage device 1434.

The processor 1405 executes computer-executable instructions for implementing aspects of the disclosure. In some examples, the processor 1405 is transformed into a special purpose microprocessor by executing computer-executable instructions or by otherwise being programmed. For example, the processor 1405 is programmed with instructions such as those shown in FIGS. 4-7.

In at least one example, a projection unit 100 is provided. The projection unit 100 includes at least one projector 115 configured to project an image 105 onto one or more display surfaces 110. The at least one projector 115 is configured to project one of a series of images and a video. The projection unit 100 also includes at least one sensor 305 configured to indicate a current position of the one or more display surfaces 110. The projection unit 100 also includes a projector controller 140 in communication with the at least one projector 115 and the at least one sensor 305. The projector controller 140 is programmed to receive a signal from the at least one sensor 305 indicating that a current position of a display surface 110. The projector controller 140 is further programmed to adjust at least one image 105 based on the current position of the display surface 110. The projector controller 140 is also programmed to instruct the at least one projector 115 to project the adjusted at least one image 105 onto the display surface 110 based on the current position of the display surface 110.

In some examples, the display surface 110 is a tray table 805 and the signal further indicates that the tray table 805 is deployed. The projector controller 140 can be further programmed to receive a second signal from the at least one sensor 305 indicating that the tray table 805 has been stowed. The projector controller 140 can instruct the at least one projector 115 to halt projection of images 105.

The projector controller 140 can also be programmed to receive a second signal from the at least one sensor 305 indicating a first position of an object 810 on the display surface 110. The projector controller 140 can instruct the at least one projector 115 to adjust the projection of the at least one image 105 based on the first position of the object 810 on the display surface 110.

The projector controller 140 can additionally be programmed to receive a second signal from the at least one sensor 305 indicating that the display surface 110 has moved to a second position. The projector controller 140 can instruct the at least one projector 115 to adjust the projection of the at least one image 105 based on the second position of the display surface 110.

Moreover, the projector controller 140 can be programmed to receive a signal from the at least one sensor 305 indicating that no passenger is in a corresponding seat. The projector controller 140 can instruct the at least one projector 115 to project an image 105 including at least a seat number onto the display surface 110 associated with the seat.

Furthermore, the projector controller 140 can additionally be programmed to determine a current mode. The projector controller 140 determines the at least one image 105 for the at least one projector 115 to display based on the current mode.

In addition, the projector controller 140 can additionally be programmed to receive an instruction that a passenger has turned on a reading light. The projector controller 140 instructs the at least one projector 115 to transmit a projection of light onto at least a portion of a seat of the passenger. The projector controller 140 can also receive a signal from the at least one sensor 305 indicating a location of an object 810 that a passenger desires to be illuminated. The projector controller 140 instructs the at least one projector 115 to transmit the projection of light based on the location of the object.

Additionally, the projection unit 100 includes a gimbal 125 and a mirror 120. The projector controller 140 is further programmed to instruct the gimbal 125 to adjust an orientation of the mirror 120 to adjust a location of the projected at least one image 105.

Additionally, the projection unit 100 includes an aperture 130. The at least one projector 115 projects the at least one image 105 through the aperture 130.

Furthermore, the signal can further include a shape of the display surface 110. The projector controller 140 is further programmed to adjust the at least one image 105 to project based on the shape of the display surface 110.

The methods and system described herein can be implemented using computer programming or engineering techniques including computer software, firmware, hardware, or any combination or subset. As disclosed above, there is a need for systems providing a cost-effective and reliable manner for customizing surfaces. The system and methods described herein address that need. Additionally, this system: (i) allows customization of surfaces without requiring change of equipment; (ii) allows changing the customization of surfaces without requiring changing of equipment; (iii) provides interaction based on user actions; (iv) provides safety features for a movable translucent display; (v) provides an additional set of customization entertainment options without requiring changing between equipment setups; and (iv) provides unique dinner time experiences.

The methods and systems described herein can be implemented using computer programming or engineering techniques including computer software, firmware, hardware, or any combination or subset thereof, wherein the technical effects can be achieved by performing at least one of the following steps: a) receive a signal from the at least one sensor indicating a current position of a display surface; b) adjust at least one image to project based on the current position of the display surface; c) instruct the at least one projector to project the adjusted at least one image onto the display surface based on the current position of the display surface; d) receive a second signal from the at least one sensor indicating that the tray table has been stowed, wherein the display surface is a tray table, wherein the signal further indicates that the tray table is deployed; e) instruct the at least one projector to halt projection of images; f) receive a second signal from the at least one sensor indicating a first position of an object on the display surface; g) instruct the at least one projector to adjust projection of the at least one image based on the first position of the object on the display surface; h) receive a second signal from the at least one sensor indicating that the display surface has moved to a second position; i) instruct the at least one projector to adjust projection of the at least one image based on the second position of the display surface; j) receive a signal from the at least one sensor indicating that no passenger is in a corresponding seat; k) instruct the at least one projector to project an image including at least a seat number onto the display surface associated with the seat; l) determine a current mode; m) determine the at least one image for the at least one projector to display based on the current mode; n) receive an instruction that a passenger has turned on a reading light; o) instruct the at least one projector to transmit a projection of light onto at least a portion of a seat of the passenger; p) receive a signal from the at least one sensor indicating a location of an object that a passenger desires to be illuminated; q) instruct the at least one projector to transmit the projection of light based on the location of the object; r) instruct the gimbal to adjust an orientation of the mirror to adjust a location of the projected at least one image; s) project the at least one image through the aperture; and t) adjust the at least one image to project based on the shape of the display surface, wherein the signal further includes a shape of the display surface.

The computer-implemented methods discussed herein can include additional, less, or alternate actions, including those discussed elsewhere herein. The methods can be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein can include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein can be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A projection unit comprising:
   at least one projector configured to project an image onto one or more display surfaces;
   at least one sensor configured to indicate a current position of the one or more display surfaces; and
   a projector controller in communication with the at least one projector and the at least one sensor, wherein the projector controller is programmed to:
   receive a signal from the at least one sensor indicating a current position of a display surface;
   adjust at least one image to project based on the current position of the display surface;
   instruct the at least one projector to project the adjusted at least one image onto the display surface based on the current position of the display surface;
   receive a second signal from the at least one sensor indicating that the display surface has moved to a second position; and
   instruct the at least one projector to adjust projection of the at least one image based on the second position of the display surface.

2. The projection unit of claim 1, wherein the display surface is a tray table, wherein the signal further indicates that the tray table is deployed.

3. The projection unit of claim 2, wherein the projector controller is further programmed to:
   receive a second signal from the at least one sensor indicating that the tray table has been stowed; and
   instruct the at least one projector to halt projection of images.

4. The projection unit of claim 1, wherein the projector controller is further programmed to:
   receive a second signal from the at least one sensor indicating a first position of an object on the display surface; and
   instruct the at least one projector to adjust projection of the at least one image based on the first position of the object on the display surface.

5. The projection unit of claim 1, wherein the projector controller is further programmed to:
   receive a signal from the at least one sensor indicating that no passenger is in a corresponding seat; and
   instruct the at least one projector to project an image including at least a seat number onto the display surface associated with the seat.

6. The projection unit of claim 1, wherein the projector controller is further programmed to:
   determine a current mode; and
   determine the at least one image for the at least one projector to display based on the current mode.

7. The projection unit of claim 1, wherein the projector controller is further programmed to:
   receive an instruction that a passenger has turned on a reading light; and
   instruct the at least one projector to transmit a projection of light onto at least a portion of a seat of the passenger.

8. The projection unit of claim 7, wherein the projector controller is further programmed to:
   receive a signal from the at least one sensor indicating a location of an object that a passenger desires to be illuminated; and
   instruct the at least one projector to transmit the projection of light based on the location of the object.

9. The projection unit of claim 1 further comprising a gimbal and a mirror, and wherein the projector controller is further programmed to instruct the gimbal to adjust an orientation of the mirror to adjust a location of the projected at least one image.

10. The projection unit of claim 1 further comprising an aperture, wherein the at least one projector projects the at least one image through the aperture.

11. The projection unit of claim 1, wherein the signal further includes a shape of the display surface, and wherein the projector controller is further programmed to adjust the at least one image to project based on the shape of the display surface.

12. A method for operating a projector system, where the method is implemented by a computing device comprising at least one processor in communication with at least one memory device, wherein the computing device is in communication with at least one sensor and at least one projector, the method comprising:
   receiving, from the at least one sensor, a signal indicating a current position of a display surface;
   adjusting at least one image to project based on the current position of the display surface;
   instructing the at least one projector to project the adjusted at least one image onto the display surface based on the current position of the display surface;

receiving a second signal from the at least one sensor indicating a first position of an object on the display surface; and instructing the at least one projector to adjust projection of the at least one image based on the first position of the object on the display surface.

13. The method of claim 12, wherein the display surface is a tray table, wherein the signal further indicates that the tray table is deployed, and wherein the method further comprises:

receiving a second signal from the at least one sensor indicating that the tray table has been stowed; and instructing the at least one projector to halt projection of images.

14. The method of claim 12 further comprising:

receiving a second signal from the at least one sensor indicating that the display surface has moved to a second position; and instructing the at least one projector to adjust projection of the at least one image based on the second position of the display surface.

15. The method of claim 12 further comprising:

receiving a signal from the at least one sensor indicating that no passenger is in a corresponding seat; and instructing the at least one projector to project an image including at least a seat number onto a display surface associated with the seat.

16. The method of claim 12 further comprising:

determining a current mode; and determining the at least one image for the at least one projector to display based on the current mode.

17. The method of claim 12 further comprising:

receiving an instruction that a passenger has turned on a reading light; and instructing the at least one projector to transmit a projection of light onto at least a portion of a seat of the passenger.

18. The method of claim 17 further comprising:

receiving a signal from the at least one sensor indicating a location of an object that a passenger desires to be illuminated; and instructing the at least one projector to transmit the projection of light based on the location of the object.

19. A projection unit comprising:

at least one projector configured to project an image onto one or more display surfaces;

at least one sensor configured to indicate a current position of the one or more display surfaces; and a projector controller in communication with the at least one projector and the at least one sensor, wherein the projector controller is programmed to:

receive a signal from the at least one sensor indicating a current position of a display surface, wherein the display surface is a tray table, wherein the signal further indicates that the tray table is deployed;

adjust at least one image to project based on the current position of the display surface; and instruct the at least one projector to project the adjusted at least one image onto the display surface based on the current position of the display surface.

20. A projection unit comprising:

at least one projector configured to project an image onto one or more display surfaces;

at least one sensor configured to indicate a current position of the one or more display surfaces; and a projector controller in communication with the at least one projector and the at least one sensor, wherein the projector controller is programmed to:

receive a signal from the at least one sensor indicating a current position of a display surface;

adjust at least one image to project based on the current position of the display surface;

instruct the at least one projector to project the adjusted at least one image onto the display surface based on the current position of the display surface;

receive a second signal from the at least one sensor indicating a first position of an object on the display surface; and instruct the at least one projector to adjust projection of the at least one image based on the first position of the object on the display surface.

21. A projection unit comprising:

at least one projector configured to project an image onto one or more display surfaces;

at least one sensor configured to indicate a current position of the one or more display surfaces; and a projector controller in communication with the at least one projector and the at least one sensor, wherein the projector controller is programmed to:

receive a signal from the at least one sensor indicating a current position of a display surface;

adjust at least one image to project based on the current position of the display surface;

instruct the at least one projector to project the adjusted at least one image onto the display surface based on the current position of the display surface;

receive an instruction that a passenger has turned on a reading light; and instruct the at least one projector to transmit a projection of light onto at least a portion of a seat of the passenger.

22. A projection unit comprising:

at least one projector configured to project an image onto one or more display surfaces;

at least one sensor configured to indicate a current position of the one or more display surfaces; and a projector controller in communication with the at least one projector and the at least one sensor, wherein the projector controller is programmed to:

receive a signal from the at least one sensor indicating a current position of a display surface, wherein the signal further includes a shape of the display surface;

adjust at least one image to project based on the current position of the display surface and the shape of the display surface; and instruct the at least one projector to project the adjusted at least one image onto the display surface based on the current position of the display surface.

23. A projection unit comprising:

at least one projector configured to project an image onto one or more display surfaces;

at least one sensor configured to indicate a current position of the one or more display surfaces; and a projector controller in communication with the at least one projector and the at least one sensor, wherein the projector controller is programmed to:

receive a signal from the at least one sensor indicating a current position of a display surface;

adjust at least one image to project based on the current position of the display surface;

instruct the at least one projector to project the adjusted at least one image onto the display surface based on the current position of the display surface;
receive a signal from the at least one sensor indicating that no passenger is in a corresponding seat; and
instruct the at least one projector to project an image including at least a seat number onto a display surface associated with the seat.

\* \* \* \* \*